(12) United States Patent
Kossin

(10) Patent No.: US 10,339,623 B2
(45) Date of Patent: Jul. 2, 2019

(54) PHASE ROTATION WATERMARKING FOR PHASE MODULATION

(71) Applicant: Harris Corporation, Melbourne, FL (US)

(72) Inventor: Philip Smith Kossin, Clifton, NJ (US)

(73) Assignee: Harris Corporation, Melbourne, FL (US)

( * ) Notice: Subject to any disclaimer, the term of this patent is extended or adjusted under 35 U.S.C. 154(b) by 210 days.

(21) Appl. No.: 15/675,461

(22) Filed: Aug. 11, 2017

(65) Prior Publication Data
US 2019/0050956 A1 Feb. 14, 2019

(51) Int. Cl.
*G06T 1/00* (2006.01)
*H04L 27/18* (2006.01)
(Continued)

(52) U.S. Cl.
CPC ............ *G06T 1/005* (2013.01); *H04L 9/0891* (2013.01); *H04L 27/183* (2013.01);
(Continued)

(58) Field of Classification Search
CPC ... G06T 1/005; H04N 21/8358; H04L 9/0891; H04L 27/22; H04L 27/2003; H04L 27/183
(Continued)

(56) References Cited

U.S. PATENT DOCUMENTS

| 8,391,490 B2 | 3/2013 | Damidaux |
| 9,231,760 B2 | 1/2016 | Wiley et al. |

(Continued)

FOREIGN PATENT DOCUMENTS

| CA | 2790981 C | 4/2016 |
| EP | 2804337 A1 | 11/2014 |

OTHER PUBLICATIONS

Tosato, F., et al., "An Analogue Overlaying Scheme Based on Phase Rotations," 2009 IEEE 10th Workshop on Signal Processing Advances in Wireless Communications, Piscataway, NJ, pp. 449-453 (Jun. 2009).
(Continued)

*Primary Examiner* — Amandeep Saini
(74) *Attorney, Agent, or Firm* — Edell, Shapiro & Finnan, LLC

(57) ABSTRACT

A method of generating a phase modulated signal includes generating a sequence of phase modulated host symbols having continuous, antipodal phase transitions between adjacent ones of the host symbols representing different states, and generating a sequence of overlay symbols each spanning a respective set of the host symbols. The method further includes rotating the continuous, antipodal phase transitions between the adjacent ones of the host symbols in each set of the host symbols in a same rotation direction according to a symbol state of the respective overlay symbol spanning the set of the host symbols, and generating a phase modulated transmit signal that conveys the continuous, antipodal phase transitions rotated according to the symbol states of the overlay symbols. For M-ary PSK, the method further includes encoding both antipodal and non-antipodal host symbol phase shifts to carry the data of the overlay symbols.

20 Claims, 15 Drawing Sheets

CONSTANT ENVELOPE BPSK
WITH COUNTER-CLOCKWISE
(POSITIVE) PHASE TRANSITION

CONSTANT ENVELOPE BPSK
WITH CLOCKWISE (NEGATIVE)
PHASE TRANSITION

(51) Int. Cl.
*H04L 27/20* (2006.01)
*H04L 27/22* (2006.01)
*H04L 9/08* (2006.01)
*H04N 21/8358* (2011.01)

(52) U.S. Cl.
CPC .......... *H04L 27/2003* (2013.01); *H04L 27/22* (2013.01); *H04N 21/8358* (2013.01)

(58) Field of Classification Search
USPC ........................................................ 382/100
See application file for complete search history.

(56) References Cited

U.S. PATENT DOCUMENTS

| | | | |
|---|---|---|---|
| 9,514,500 B2 | 12/2016 | Zitzmann et al. | |
| 9,571,317 B1* | 2/2017 | Kossin | H04L 27/20 |
| 2005/0094711 A1* | 5/2005 | Miller | H04J 13/10 |
| | | | 375/146 |
| 2010/0303235 A1 | 12/2010 | Damidaux | |
| 2013/0216090 A1 | 8/2013 | Zitzmann et al. | |
| 2013/0261788 A1 | 10/2013 | Zitzmann et al. | |
| 2013/0287369 A1 | 10/2013 | Geyzel | |

OTHER PUBLICATIONS

Search Report in corresponding European Patent Application No. 18188678, dated Jan. 16, 2019.

Lebold, B., "Physical layer watermarking of binary phase-shift keyed signals using standard gnu radio blocks," Thesis, Oklahoma State University, 2011.

Pozzobon, O., et al., "Anti-spoofing and open GNSS signal authentication with signal authentication sequences," Satellite Navigation Technologies and European Workshop on GNSS Signals and Signal Processing (NAVITEC), 2010 5th ESA Workshop on. IEEE, 2010.

Pozzobon, O., "Keeping the Spoofs Out: Signal Authentication Services for Future GNSS," Inside GNSS 6.3, pp. 48-55 (2011).

Pozzobon, O., et al., "From Data Schemes to Supersonic Code: GNSS Authentication for Modernized Signals," Inside GNSS, pp. 55-64 (2015).

Scott, L., "Spoofs, Proofs & Jamming: Towards a Sound National Policy for Civil Location and Time Assurance," Inside GNSS, pp. 42-53 (2012).

* cited by examiner

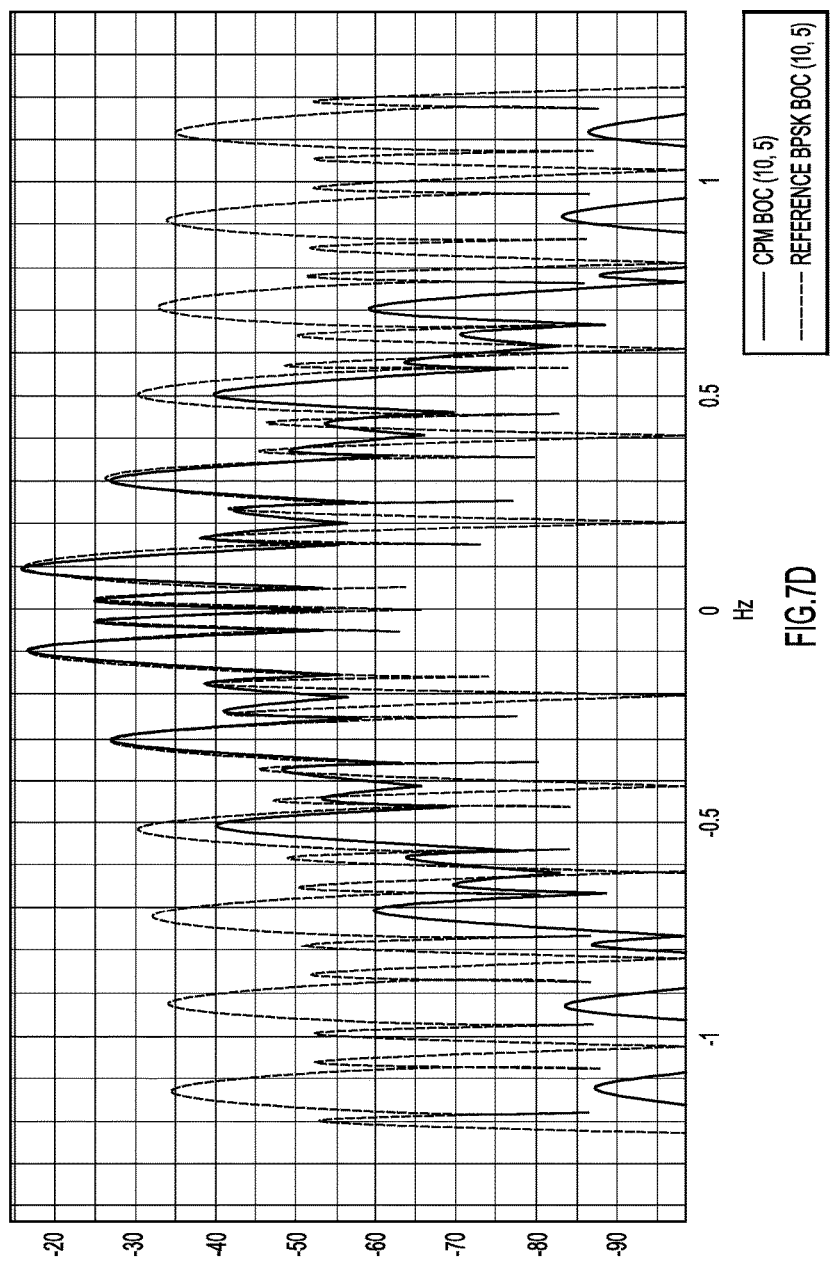

PHASE ROTATION WATERMARKING FOR PHASE MODULATION

BACKGROUND

There is a pressing need to increase the amount and/or different types of information that communication and navigation systems can transmit, without appreciably degrading the frequency spectrum associated with the transmitted information. For example, widening of the frequency spectrum and shallowing of frequency nulls within the frequency spectrum should be avoided. Such information includes, but is not limited to authentication information. Authentication may be used to identify equipment, such as transmitters and receivers, and various signals used in the communication and navigation systems. Authentication methods have been proposed for Global Positioning System (GPS) signals to combat "spoofing" attacks that inject false signals. The authentication methods enable a GPS receiver to determine that a GPS navigational waveform received by the receiver is legitimate. One such method proposes to overlay a known "watermark message" on the GPS navigational waveform transmitted from a space vehicle or other GPS broadcast platform. Such watermarking must not impact compliance with the baseline GPS navigational waveform. Methods have also been proposed to overlay an additional data channel or watermark onto a "host" data communication link. Whether the host is a navigational waveform or a data communication channel, the overlaid watermark or data channel should cause minimal degradation to the demodulated host waveform performance while providing enough energy to communicate the watermark or data message in weak signal or challenged environments such as urban multipath and jamming. The watermarking should minimize impacts on both transmitter and receiver complexity. Conventional approaches to provide such watermark overlays for GPS and general data links meet these criteria only to a limited extent in that there is still significant degradation to the underlying host waveform in order to provide a robust watermark or data overlay.

SUMMARY

An embodiment presented herein is directed to a method of superimposing a watermark or overlay data channel, hereafter referred to as the "overlay," onto a baseline or "host" phase modulated transmit signal. The method includes generating a sequence of binary phase modulated (BPSK) host symbols such that there are continuous, antipodal phase transitions between adjacent host symbols representing different states, while superimposing a sequence of overlay symbols each spanning a set of multiple host symbols. The method further includes rotating the continuous, antipodal phase transitions in each set of the host symbols in a same rotation direction according to a symbol state of the respective overlay symbol spanning the set of the host symbols, and generating a phase modulated transmit signal that conveys the continuous, antipodal phase transitions rotated according to the symbol states of the overlay symbols. Rotating the phase transitions is referred to as phase rotation watermarking and has the effect of superimposing the overlay symbols (also referred to as additional data) onto the phase modulation of the host waveform.

Another embodiment presented herein is directed to a receiver. The receiver includes a radio frequency (RF) front-end to receive an RF signal and frequency down-convert the RF signal to a down-converted signal. The RF signal and the down-converted signal each conveys (i) a sequence of phase modulated host symbols having continuous, antipodal phase transitions between adjacent host symbols representing different states, and (ii) a sequence of overlay symbols each spanning a respective set of the host symbols in time, wherein the continuous, antipodal phase transitions in each set of the host symbols are rotated in a same direction according to an overlay symbol state of the respective overlay symbol spanning the set of host symbols. The receiver also includes a first demodulator to demodulate the host symbols from the down-converted signal, and a second demodulator to demodulate the overlay symbols from the down-converted signal.

Though not strictly required, in certain implementations, the phase rotation watermarking can be incorporated into a constant envelope, constant phase modulation signal, which is a preferred method to achieve high RF/Direct Current (DC) efficiency with saturated amplifiers, while reducing the bandwidth of a transmitted signal produced using the modulations. These modulations also have low peak to average power ratio (PAPR) which results in higher power output and reduced multipaction risk since the peak power is reduced.

The proposed invention can also be applied to a non-constant envelope CPM, such as regular BPSK. In that case, the watermarking guides phase transition in a trajectory that does not go through the origin, but the overall phase trajectory may not be a circle as shown in FIGS. 2-4, discussed below, but rather an ellipse, with a brief, lower amplitude pulse on a Q channel during the phase transitions. Such watermarking adds a small amount of extra energy, which is applied only during the phase transitions. Like the constant envelope case, the phase ramp slope polarity can be accumulated over a large number of host symbols to provide robustness.

With Binary CPM (BCPM) signals, the phase trajectory between symbols may be either in the Clockwise (CW) or counterclockwise (CCW) direction without affecting the transmitted information. The phase rotation watermarking exploits the BCPM phase trajectories to overlay a channel of data (the additional/overlay data) onto the host waveform without impacting the performance of the host waveform. Since the host waveform normally transitions between antipodal phase states, encoding the direction of these phase transitions with additional data is a way of using otherwise wasted energy.

The phase rotation watermarking may also be applied to M-ary CPM where M>=4. In this case, the phase rotation watermarking may exploit only the subset of phase transitions in the M-ary CPM waveform that are antipodal.

Applications include, but are not limited to, phase rotation watermarking for authentication, overlaying an additional data channel, or superimposing a coarse acquisition signal onto a precise acquisition signal so that both can be sent over the same waveform with little or no additional power.

The above and still further features and advantages of the described system will become apparent upon consideration of the following definitions, descriptions and descriptive figures of specific embodiments thereof wherein like reference numerals in the various figures are utilized to designate like components. While these descriptions go into specific details, it should be understood that variations may and do exist and would be apparent to those skilled in the art based on the descriptions herein.

BRIEF DESCRIPTION OF THE DRAWINGS

FIG. 7D is a frequency-domain graph illustrating the power spectrum of the waveform of FIGS. 7A-7C compared with a reference binary phase shift keying (BPSK) BOC(10, 5) waveform.

DETAILED DESCRIPTION

Embodiments presented herein employ a phase modulation technique referred to as "phase rotation watermarking," "rotation watermarking," or "phase rotation modulation" to superimpose additional (overlay) data/information on continuation phase modulation of a host waveform. The superimposed additional data is also referred to herein as a "watermark" or "watermark data." Phase rotation watermarking provides a simple, robust, hard to detect, method of using the host waveform or data stream to carry the additional data without degrading transmission performance. Phase rotation watermarking exploits the inherent phase trajectory rotation between antipodal symbols of a binary phase shift keying (BPSK), quadrature phase shift keying (QPSK), M-ary phase shift keying (MPSK), or other phase modulated host waveform to carry the additional data. When the host waveform transitions between its adjacent symbols which are antipodal (180 degrees apart) there are two directions the phase trajectory can take, either clockwise or counter-clockwise. Phase rotation watermarking uses these two direction possibilities to carry the additional information. For M>=4, it is also possible to encode non-antipodal host symbol phase shifts to carry the overlay symbol phase rotation information. It can also be applied to modulations such as QAM, as will be described below. Phase rotation watermarking requires less hardware complexity than many of the other methods in use. For continuous phase modulation systems, minimal changes are needed to the modulator hardware as the phase rotation is already being generated by the modulation. Also, the embodiments offer the system designer more control over the transmitted waveform, as will be described below.

As used herein and in the claims, the term "symbol" refers to a time interval of a signal in which the signal has a symbol state (also referred to as a "symbol state value" or simply "symbol value"), or in which the phase of the signal is in a state representing some symbol value/symbol state. In the case of a spread spectrum signal in which a spreading code such as a pseudonoise (PN) code is used to spread an information signal, each "chip" of the PN code is a "symbol" within the meaning used herein (which would be distinct from a data symbol that could be represented by a sequence of such PN chips in this content).

As used herein and in the claims, the term "pattern" refers to a time sequence of symbols or symbol values in some order that can be, for example, random, indeterminate, pseudo-random or semi-random, based on a pseudo-noise code, fixed or predetermined, weighted towards certain values, and combinations thereof.

Figure 1:
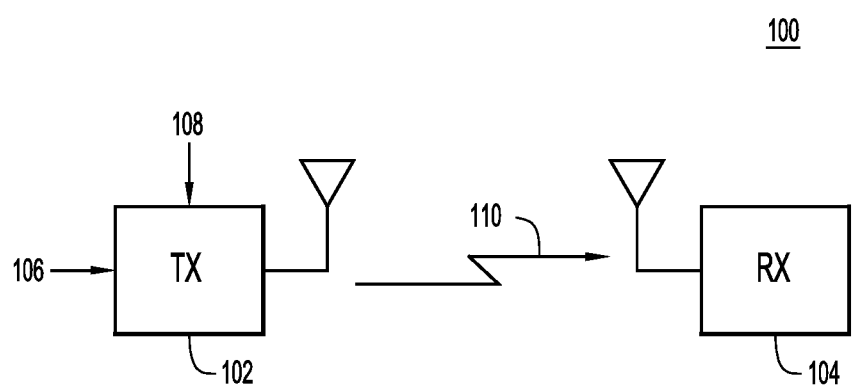
FIG. 1 is a block diagram of an example communication or navigation system in which a phase modulation technique referred to as "phase rotation watermarking" may be implemented to superimpose additional data on a host waveform.

With reference to FIG. 1, there is shown a block diagram of a communication or navigation system 100 that employs phase rotation watermarking to increase the amount and and/or different types of information transmitted by the system. System 100 includes a transmitter (TX) 102 and a receiver (RX) 104. Transmitter 102 receives a host signal 106 (also referred to as a "host waveform") including a sequence of host symbols (also referred to as "host symbols"). Transmitter 102 also receives an overlay signal 108 (also referred to as "additional data") including a sequence of overlay symbols (also referred to as "overlay symbols"). Host signal 106 may be a navigation signal, such as a GPS code, although other signals are possible. Overlay signal 108 may include a predetermined sequence of overlay symbols representative of an authentication sequence or watermark, or may include an indeterminate sequence of overlay symbols from a data source (not shown in FIG. 1).

At a high-level, transmitter 102 uses phase rotation watermarking to generate a continuous phase modulated transmit signal 110 that conveys phase information representative of both host signal 106 and overlay signal 108. Transmitter 102 transmits transmit signal 110 to receiver 104. Receiver 104 demodulates transmit signal 110 to recover replicas of host signal 106 and overlay signal 108 from the transmit signal.

The phase rotation watermarking exploits an inherent phase trajectory rotation between antipodal symbols of the host waveform (signal 106), e.g., BPSK, QPSK, or MPSK symbols, to carry the additional/overlay data (signal 108). When the host waveform transitions between adjacent symbols which are antipodal (i.e., 180 degrees apart), there are two rotation directions the phase trajectory at the transition can take, either clockwise or counter-clockwise. Phase rotation watermarking uses these two rotation direction possibilities to carry the additional data. In other words, the additional data modulates the direction of phase rotation, as will be described below.

Continuous Phase Modulation

Embodiments presented herein apply continuous phase modulation (CPM) to the host waveform (signal 106). The CPM replaces discontinuous phase transitions of an antipodal (BPSK), QPSK or other M-ary signal by a smoothed continuous trajectory. Phase rotation watermarking (PRW) modulates underlying CPM of the host waveform (signal 106) in accordance with symbol states of the additional data (signal 108) to superimpose the additional data on the host waveform. With respect to CPM, two phase shift keying cases to consider are: binary antipodal schemes, e.g., Binary Phase Shift Keying (BPSK); and M-ary PSK. With BPSK, if a single host waveform, e.g., a pseudo-noise (PN) code, is to be transmitted on a single quadrature channel, then a binary form of MSK can be used to transmit the code. In this case, two phases that are 180° apart (i.e., "antipodal" phase states) can be used to respectively represent the binary signal states. When using continuous phase transitions between symbols (referred to above as the "host symbols") of the host waveform instead of instantaneous phase transitions, there are two equivalent phase trajectory options available to perform the 180° phase transition between the two antipodal phases: proceed in the counter-clockwise direction for a total phase change of 180° (a positive phase shift ramp); or proceed in the clockwise direction for a total phase change of −180° (a negative phase shift ramp).

Figure 2:
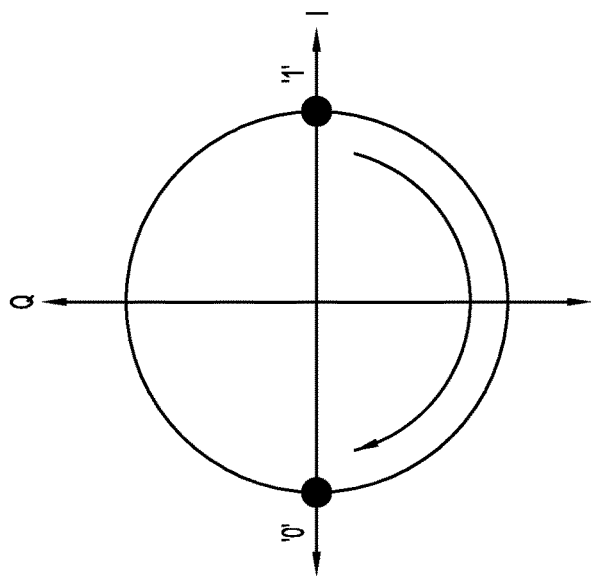
FIG. 2 illustrates two phase trajectory options (clockwise and counter-clockwise) for phase rotation transitions between two symbol phases that are 180° apart in an antipodal phase modulation scheme involving continuous phase transitions.
Figure 2:
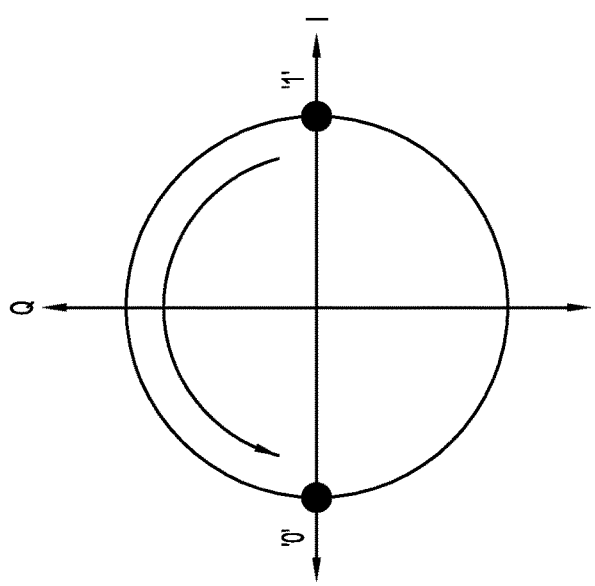

These two options are illustrated in FIG. 2 for the case where the current symbol of the host waveform is a logical '1' at a phase of 0° and the next symbol is a logical '0' at a phase of 180°. Note that an instantaneous phase change would proceed directly back and forth along the I-axis in the example shown in FIG. 2 (i.e., there is no rotational polarity); thus, the issue of phase rotation polarity exists in the context of phase modulated signals that employ continuous phase transitions between adjacent symbols. Either rotational polarity will result in the same end phases and both are identical in terms of the PN code and the CPM.

Figure 3:
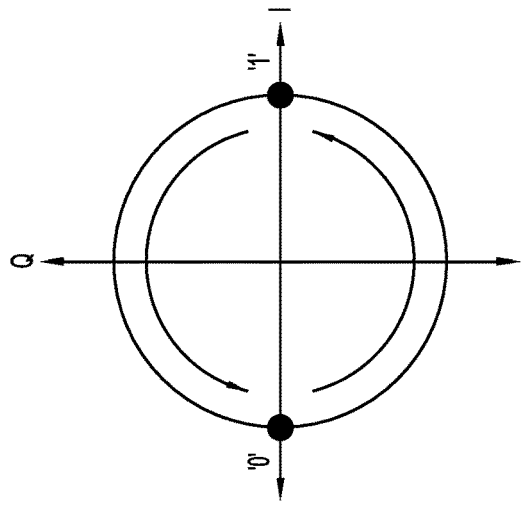
FIG. 3 illustrates an antipodal phase trajectory with a fixed, positive (counter-clockwise) phase rotation polarity for all transitions between the two symbol phases.

A CPM BPSK phase trajectory with a fixed, positive phase transition rotational is illustrated in FIG. 3. In this case, the symbol vector proceeds with a counter-clockwise phase rotation around the unit circle for all phase transitions, i.e., from a logical '1' at 0° to a logical '0' at 180° and from a logical '0' at 180° to a logical '1' at 0°.

Figure 4A:
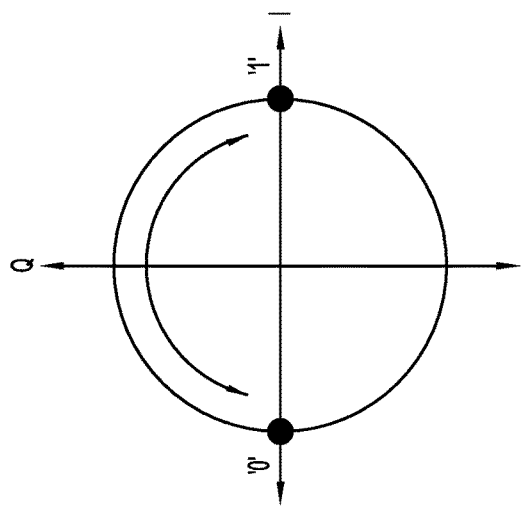
FIG. 4A illustrates an antipodal phase trajectory with an alternating phase rotation polarity for transitions between the two symbol phases.

Alternating phase transition rotational polarity per transition is shown in FIG. 4. In this case, the symbol vector rotates back and forth from a logical '1' at 0° to a logical '0' at 180°. That is, a counter-clockwise (positive) phase rotation is used to transition from the '1' phase state to the '0' phase state, while a clockwise (negative) phase rotation is used to transition from the '0' phase state to the '1' phase state. Note that in this scheme, the phase trajectory always stays in the upper half plane (as illustrated) or, alternatively, in the lower half plane if the opposite polarity convention is used (not shown). The quadrature (Q) component of the signal will therefore always be either positive (as shown in FIG. 3) or negative (in the convention not shown) for all phase transitions. This introduces a DC bias and causes spurs to appear in the spectrum.

Where there is PN data on both the in-phase (I) and quadrature (Q) channels, such as with quadrature PSK (QPSK) or M-ary phase constellations, CPM can also be used to maintain a constant envelope. However, the possibility of +180° or −180° phase transitions between adjacent symbols still exists. As described earlier, host symbol phase shifts of +90 or −90 can also be made to follow −270 or +270 phase transition trajectories to carry the overlay symbol phase slope polarity.

Phase Rotation Watermarking

As described above, CPM of the BPSK host waveform (signal 106) imposes continuous phase transitions between adjacent symbols of the host waveform having antipodal phase transitions. In other words, the CPM imposes continuous, antipodal phase transitions on the BPSK host waveform. Phase rotation watermarking controls the direction of phase rotation (i.e., phase rotation polarity) of the continuous, antipodal phase transitions in accordance with/based on symbol state values of the overlay symbols of the additional data, so that the direction of phase rotation of the continuous, antipodal phase transitions represents the overlay/additional data. That is, the overlay/additional data watermarks/modulates the direction of rotation of the continuous, antipodal phase transitions and, in this way, superimposes the overlay/additional data on the host waveform. Similarly, as described earlier for QPSK and by extension to any other M>=4 CPM waveform, the adjacent host symbol shifts can be encoded to yield the desired total polarity and slope of the phase transition rotation of each overlay symbol as an average over all the host symbol phase transitions.

Figure 5:
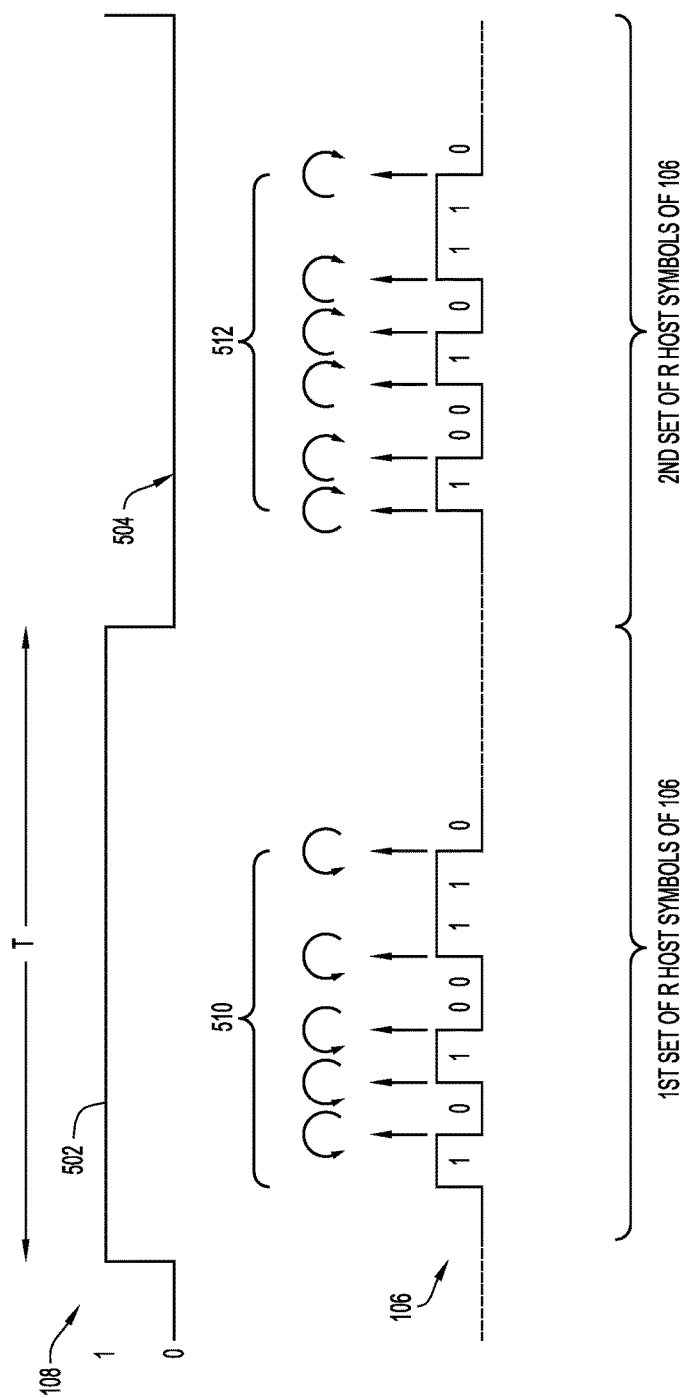
FIG. 5 is a time-domain graph showing how phase rotation watermarking controls rotational phase polarities of continuous phase transitions for a host signal according to an overlay signal.

With reference to FIG. 5, there is shown a timing diagram of host signal 106 (the host waveform) and overlay signal 108 (the additional data) in an example in which phase rotation watermarking uses the overlay signal to control the direction of the phase rotation of the transitions of the CPM host signal. In the example of FIG. 5, signal 106 is a high symbol rate signal and overlay signal 108 is a low symbol rate signal 106 includes a sequence of host symbols having respective host symbols state values '1' and '0'. In signal 106, transitions between '1' and '0', and vice versa, trigger continuous, adjacent antipodal phase transitions of the CPM, as described above. Overlay signal 108 includes a sequence of overlay symbols, i.e., symbols 502 and 504, having respective overlay symbol state values of '1' and "0." Overlay symbols 502 and 504 each have an overlay symbol time or time interval T that spans multiple, R, host symbols of host signal 106. Each overlay symbol time interval T may span a set of any number of host symbols, such as 8, 12, 30, 62, 128, 250, and so on host symbols.

Phase rotation watermarking assigns/maps a respective phase rotation polarity (e.g., clockwise or counter-clockwise direction of rotation) to each possible overlay symbol state/value (e.g., '0' or '1') that a given overlay symbol (e.g., symbol 502 or 504) of overlay signal 108 can take on. Then, for each set of R host symbols, the phase rotation watermarking imposes a common/same phase rotation polarity (e.g., clockwise phase rotation or counter-clockwise phase rotation) on all of the continuous, antipodal phase transitions in the set of R host symbols according to the overlay symbol state of the overlay symbol spanning the set of R host symbols. That is, phase rotation watermarking rotates all of the continuous, antipodal phase transitions in the set of R host symbols in a same direction according to the overlay symbol state spanning the set of R host symbols. As a result, in terms of phase change, the phase rotation watermarking accumulates all of the individual rotational phase changes in the same direction across each set of R host symbols into a total phase change indicative of the overlay symbol state of the overlay symbol spanning the R host symbols. This is akin to summing a series of small phase change ramps across the R host symbols into one big phase change ramp representative of the overlay symbol state/value of the overlay symbol spanning the R host symbols. The total phase change across the big phase change ramp will be negative or positive depending on whether the common phase rotation polarity is clockwise or counter-clockwise, respectively.

In the example of FIG. 5, the phase rotation watermarking assigns clockwise and counter-clockwise phase rotation polarities to overlay symbol states/values '0' and '1', respectively. Thus, as shown in FIG. 5, the phase rotation watermarking rotates all of the continuous, antipodal phase transitions 510 in the left-most R host symbols of host signal 106 in the counter-clockwise direction, according to the overlay symbol state '1' of overlay symbol 502 spanning those R host symbols. As a result, the phase rotation watermarking accumulates a total positive rotational phase change over overlay symbol 502 that is representative of the overlay symbol state '1'. In contrast, the phase rotation watermarking rotates all of the continuous, antipodal phase transitions 512 in the right-most R host symbols of host signal 106 in the clockwise direction, according to the overlay symbol state '0' of overlay symbol 504 spanning those R host symbols. As a result, the phase rotation watermarking accumulates a total negative rotational phase change over overlay symbol 504, which is representative of the overlay symbol state '0.' To avoid wraparound of accumulated phase, techniques herein avoid setting+/−N*2*PI values of accumulated phase equal to 0.

Phase Trajectory with Greater Degrees of Freedom in Waveform Design

As described above, the discontinuous phase transitions of the antipodal (BPSK), QPSK or other M-ary modulation signal of the host waveform (host signal 106) are replaced by a smoothed continuous trajectory. This enables a system designer to choose the most optimal phase trajectory function and phase polarity pattern to fit the particular application requirements for correlation loss and spectral content, as described below.

One possibility is to obtain the phase as the integral of Gaussian filtered frequency pulses of width $T_p$, where the overall symbol time of each host symbol of the host waveform is $T_s$, and the ratio $(T_p/T_s)$ and the Gaussian filter bandwidth is B form two parameters of the phase trajectory optimization space.

There many other possible phase trajectory functions that can be used with the phase rotation pattern aspect of this invention, each with their own unique spectral and correlation parameters. These can be the integral of filtered frequency pulses where the filter transfer function $H(f)$ is non-Gaussian. For example, a linear, a raised cosine, Bessel, Butterworth, Chebyshev, elliptical, arbitrary digital FIR, or IIR filters could be used to filter the frequency pulses.

There are other arbitrary trajectory functions that are not even expressed in terms of an integral of a filtered frequency pulse, but rather by defining the continuous phase trajectory directly. There are a large number of possible trajectory functions, but an optimal trajectory can be found using the methodology described below.

The phase trajectory can be tailored to the particular transmission channel over which the system operates. Modern waveform generators use digital signal processing methods, where N samples are used to represent each host symbol phase trajectory. Each sample is represented by a K-bit word, and there are $2^{NK}$ possible trajectories. Using common values such as 8-bit words (K=8) and 6 samples per host symbol (N=6) reveals that there is a large number of possible trajectories ($2^{48}$). However, the search space can be significantly narrowed using symmetry constraints, because the trajectory function of the last three samples will be a mirror or inverted version of the first three samples. Thus, in this example, the search space is actually $2^{24}$=1.7E+07 unique trajectory functions. This number is small enough that current computer simulation techniques can evaluate this number of possible trajectories in a reasonable amount of time and determine the optimal trajectory for the application based on the spectral constraints and correlation requirements. The actual number of possibilities can also be reduced by constraining the phase trajectory to be monotonically increasing or decreasing during each host symbol transition. Further, methods of reducing the search space can be found and are beyond the scope of this application. Once the optimal phase trajectory has been found, it can be stored in a look up table to be used in real time for the waveform generation using a digital signal processor (DSP) or field programmable gate array (FPGA).

First Example Transmitter Implementations

Figure 6A:
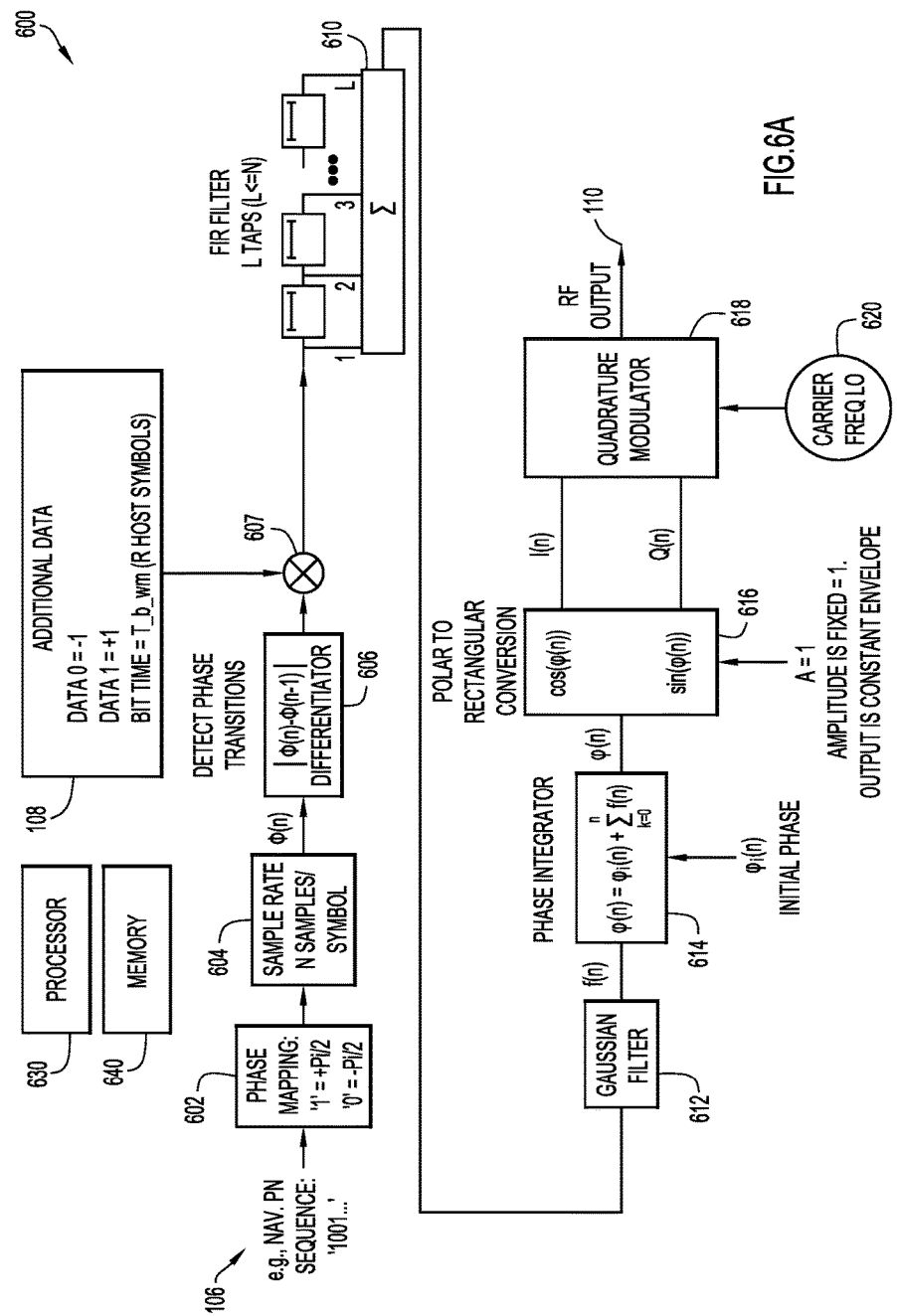
FIG. 6A is a block diagram of an example modulation system capable of implementing phase rotation watermarking.

FIG. 6A is a block diagram illustrating the components of an example transmitter implementation of an RF modulation system 600 of transmitter 102 capable of generating an antipodal (e.g., BPSK) transmit signal having a phase transition pattern of continuous, antipodal phase transition trajectories resulting from phase rotation watermarking, which has the effect of superposing overlay signal 108 on host signal 106. In this example, the underlying transmit signal (host signal 106) is a navigation signal having a PN symbol sequence; however, the invention is not limited to navigation signals and is applicable to other suitable signal types.

Each of the various components shown in FIG. 6A essentially performs certain operations for generating the transmit signal, and individual components can be implemented in hardware, software, or a combination of hardware and software, as appropriate. For example, modulation system 600 includes a processing capability generally represented by a processor 630, which can include, for example, one or more microprocessors, microcontrollers, or digital signal processors capable of executing program instructions (i.e., software) for carrying out at least some of the various operations and tasks to be performed by modulation system 600.

Modulation system 600 further includes one or more memory or storage devices represented by memory module 640 to store a variety of data and software instructions (control logic) for execution by processor 630. Memory 330 may comprise read only memory (ROM), random access memory (RAM), magnetic disk storage media devices, optical storage media devices, solid-state memory devices, flash memory devices, electrical, optical, or other physical/tangible (e.g., non-transitory) memory storage devices. Thus, in general, memory 640 comprises one or more tangible (non-transitory) processor-readable or computer-readable storage media that stores or is encoded with instructions (e.g., control logic/software) that, when executed by processor 630, cause processor 630 to perform the operations described herein. Memory 640 may also store various other data and information necessary for operation of modulation system 600.

While processor 630 and memory 640 suggest a processing environment comprising a data or signal processor that executes software stored in a memory, one or more of the components of modulation system 600 shown in FIG. 6A can be implemented in hardware as a fixed data or signal processing element, such as an application specific integrated circuit (ASIC) that is configured, through fixed hardware logic, to perform certain functions. Yet another possible processing environment is one involving one or more field programmable logic devices (e.g., FPGAs), or a combination of fixed processing elements and programmable logic devices.

Referring again to FIG. 6A, a phase mapper 602 phase maps an input (host) symbol sequence of host signal 106, e.g., an input navigation symbol sequence, by assigning specific phases to the logical zeros and ones of the input sequence. For example, each logical '1' in the host symbol sequence can be mapped to the phase π/2 radians (90°), while each logical '0' can be mapped to the phase −π/2 radians (−90°). The phase-mapped PN/host symbol sequence is digitally sampled at a rate of N samples per symbol by a digital sampler 604, resulting in an output sequence of phases φ(n). A phase differentiator 606 differentiates the samples by comparing successive samples (φ(n)−φ(n−1)) to detect samples where phase transitions occur. Phase differentiator 606 provides its output to a multiplier 607. The output of phase differentiator 606 is a magnitude indicating the size of the phase step. This output generates a positive, pulse-like signal at the symbol boundary between host symbols of different values (i.e., when a '0' is followed by a '1' or vice versa). For a phase transition in a BPSK signal, the phase step is ±π. The magnitude of the phase step in this example is π and is unsigned.

Concurrent with the operations performed by modules 602, 604, and 606, multiplier 607 receives overlay signal 108 including a sequence of overlay symbols representing logic levels '1' and '0' as overlay symbol states/levels +1 and −1, respectively. In an embodiment, a symbol state mapper (not shown) may be used to map each logic level 1 or 0 of the overlay signal 108 to the corresponding overlay symbol state +1 or −1. Each overlay symbol has a time interval T_b_wm that spans a corresponding set of R host symbols of host signal 106 in time. Each overlay symbol may also be referred to as a "phase rotation polarity signal."

Next, multiplier 607 multiplies the phase transition steps generated by the magnitude of the differentiator 606 by the by the overlay symbol states (+1 or −1) of signal 108, to patternize/modulate/impose the direction of phase rotation from one antipodal host symbol to another around the unit circle in accordance with the (mapped) overlay symbol states. That is, the overlay symbol states rotate the continuous, antipodal phase transitions of the host waveform spanned by the symbol states according to values of the overlay symbol states. Thus, multiplier 607 is more generally referred to as a "phase rotator." The sequence of overlay symbol states or phase rotation polarity signals of signal 108 represents a "phase transition polarity pattern" that follows/matches the sequence of overlay symbols states (whether represented as logic levels '0' and '1' or as corresponding polarity signals +1 and −1) of signal 108. This phase transition polarity pattern can represent a predetermined fixed sequence representative of a watermark sequence, an indeterminate sequence from some data source, random, or pseudo-random, and various sequence parameters can be chosen to achieve desired spectral and correlation properties. As previously described, each phase rotation polarity signal (overlay symbol state) in the pattern sequence (the sequence of overlay symbol states of signal 108) is applied to the sampled PN signal over a span of R overlay symbols since the output of symbol state mapper is constant over an R overlay symbol interval. Multiplying the phase transition steps generated by the magnitude of the differentiator 606 by the phase rotation polarity signal preserves the time of the transitions within the PN sequence but sets the transition polarity based on the pattern.

Referring once again to FIG. 6A, an FIR filter 610 having L taps, where L is less than or equal to the total number of samples N in a host symbol, can be used to repeat the phase transition samples L times such that, for each phase transition, the first L out of the total of N samples in the host symbol are used for the phase transition trajectory. By way of a non-limiting example, each of the L taps of FIR filter 610 can have a coefficient=1. According to another approach, FIR filter 610 can have N taps and have the first L coefficients=1, while the remaining L-N coefficients are set to zero. The purpose of the FIR filter is to control the fraction of the host symbol (L/N) during which the phase is in transition. For example, if there are 12 samples per host symbol (N=12) and L=6, then during the first half of the host symbol the phase can be transitioning while during the second half (the last 6 samples), the phase is relatively constant. Note that conventional MSK (linear ramp phase transition) and GMSK (Gaussian phase transition) CPM techniques have the phase transition occurring over the entire host symbol interval (i.e., L=N). In the above described technique, the portion of the host symbol interval over which the phase transition occurs can be controlled by setting the value of L to less than or equal to N. The number of non-zero-coefficient taps L (and consequently the ratio L/N) and the Gaussian filter bandwidth B both affect the resulting spectrum and correlation function of the output signal and can be chosen to achieve the desired spectral and correlation properties for a particular application. If L is a relatively small number (e.g., closer to 0 than N), then the phase transition between adjacent host symbols is relatively short and the resulting modulation tends to have correlation and spectral properties more like that of a signal with instantaneous phase transitions. If L is a relative large number (e.g., closer to N than 0), then the phase transition between adjacent host symbols is relatively long, and the spectral characteristic of the signal are more like that of a typical CPM signal (though the correlation function, while suffering some correlation loss, may nevertheless maintain deep nulls like the instantaneous phase transition signal due to the phase rotation polarity pattern described herein). Generally, since the host symbols each comprise the plurality of N samples, and the phase trajectory of the continuous phase transitions extends over L samples, L may be less than or equal to N. Thus, in one embodiment, the phase trajectory of the continuous, antipodal phase transitions extends over an entire host symbol. In another embodiment, the phase trajectory of the continuous, antipodal phase transitions extends over only part of a host symbol.

For each phase transition, the output of FIR filter 610 is essentially a set of L time-domain samples. A Gaussian digital filter 612 for shaping the frequency samples applies a transfer function h(n) to the L repeated samples to produce an instantaneous frequency output signal f(n). By way of a non-limiting example, the Gaussian filter can apply the following transfer function:

$$h(n) = \sqrt{\frac{2\pi}{\ln 2}} Be^{\left(\frac{-2\pi^2 B^2 (nT_s)^2}{\ln 2}\right)}$$

where B is the bandwidth of the filter. The filter bandwidth B can be chosen to provide the desired output spectrum and correlation performance. However, a Gaussian filter may not be the optimal filter for a given application, and another low pass filter that suitably shapes the frequency samples can be used. Furthermore, a suitable filter transfer function can be used to compensate for the nonlinear RF power amplifier characteristics and characteristics of downstream filters. The frequency pulse shape can be optimized to comply with the transmitter spectral requirements while providing the lowest correlation loss and deepest nulls in the cross-correlation function in the user receiver front-end bandwidth, and/or highest possible RF signal level in the receiver bandwidth. The output of Gaussian filter 612 is essentially a sequence of L time-domain samples, smoothed in accordance with the Gaussian filter response, which serve as an instantaneous frequency signal $f(n)$ that, when integrated, forms the desired phase transition trajectory.

The instantaneous frequency signal $f(n)$ is supplied to a phase integrator 614 that integrates the frequency signal according to:

$$\varphi(n) = \varphi_i + \sum_{k=0}^{n} f(k)$$

where $\varphi_i$ is the initial phase, to produce a cumulative phase trajectory signal $\varphi(n)$ that provides a smooth phase step between adjacent host symbols having different values.

The cumulative phase trajectory signal $\varphi(n)$ is supplied to a constant amplitude polar-to-rectangular converter 616, which computes the constant envelope I(n) and Q(n) waveforms as the cosine and sine of the phase trajectory signal and passes them as inputs to a quadrature modulator 618. Quadrature modulator 618 is supplied with the transmit carrier frequency via a local oscillator 620 and generates as its output the desired continuous phase RF signal for transmission. The RF signal represents a phase modulated signal including (i) a sequence of host symbols having continuous, antipodal phase transitions between adjacent host symbols representing different states, and (ii) a sequence of overlay symbols each spanning a respective set of the host symbols in time, wherein the continuous, antipodal phase transitions in each set of the host symbols are rotated in a same rotation direction according to a symbol state of the respective overlay symbol spanning the set of host symbols.

As will be appreciated from the foregoing description, a variety of implementations are possible by selecting certain parameters such as: the number L of samples per host symbol used to perform the phase transition; the shape of the phase trajectory (e.g., Gaussian, linear, etc.); and the phase rotation polarity pattern. For example, a full MSK version of the waveform can be generated by using all of the samples in a host symbol (L=N), without filtering and integrating to yield a linear phase transition, whereby the phase is linearly ramped during the entire symbol interval. According to another example, a partial MSK version of the waveform can be generated by using only a fraction of the samples in a symbol (L<N) for a linear phase transition, with the phase being constant for the remainder of the host symbol. According to yet another example, a full GMSK version of the waveform can be generated by using all of the samples of a symbol (L=N), wherein the phase follows an integrated-Gaussian trajectory during the entire host symbol interval. A partial GMSK version can be achieved by using only a fraction of the samples in a symbol (L<N) for the phase transition, with the phase being constant over the remaining portion of the host symbol. Phase trajectories other than linear and Gaussian can also be used.

Figure 6B:
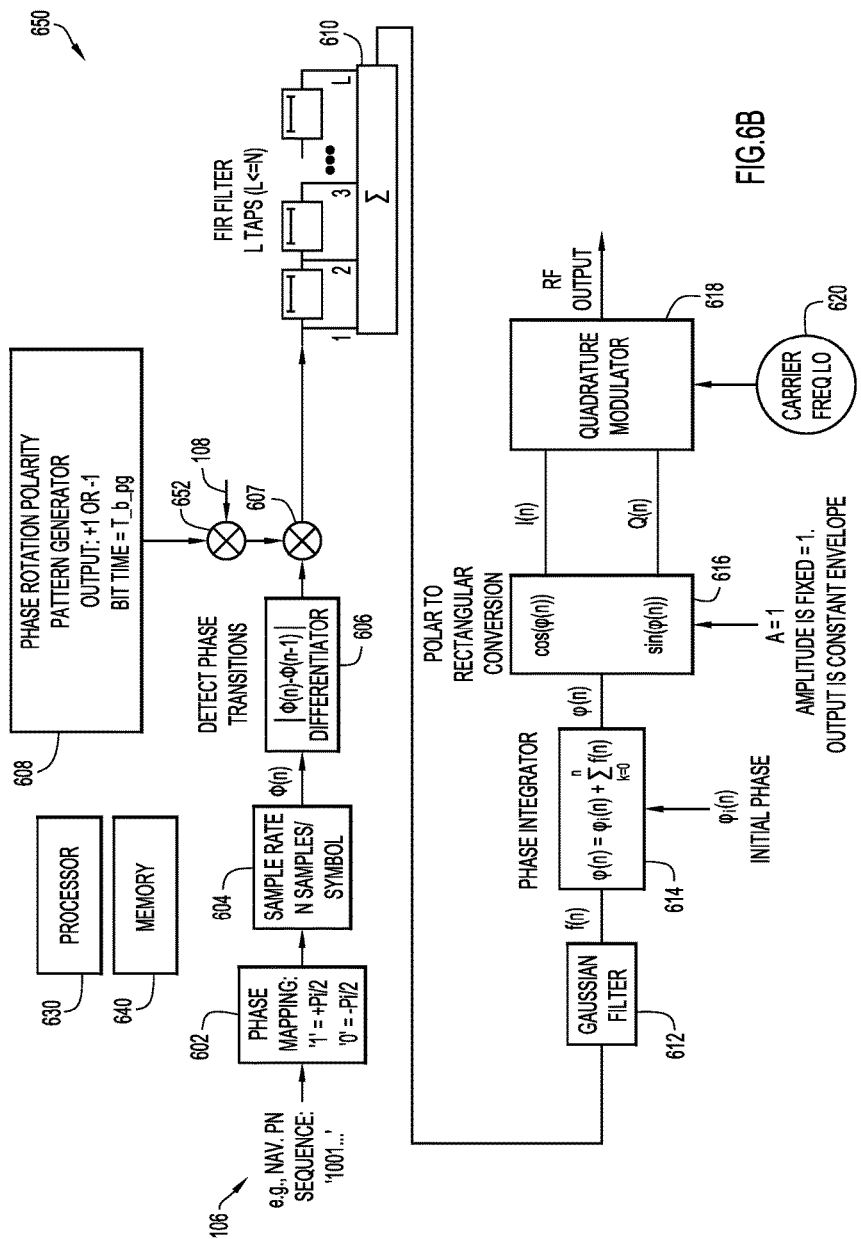
FIG. 6B is a block diagram illustrating of another example implementation of an RF modulation system capable of implementing phase rotation watermarking.

FIG. 6B is a block diagram illustrating an example transmitter implementation of an RF modulation system 650 similar to system 600, except for the addition of a phase rotation polarity pattern generator 608 and a second multiplier 652 to modulation system 650. Phase rotation polarity pattern generator 608 randomizes or patternizes the direction of phase rotation described above from one antipodal symbol to another around the unit circle. Such randomization or patternization of the rotational polarity achieves both desirable spectral qualities and correlation qualities.

Pattern generator 608 generates a phase rotation polarity signal having a sequence of values of +1 or −1 in accordance with a phase transition polarity pattern being deployed. Each symbol in the polarity signal output by pattern generator 608 has a symbol or bit time T_b_pg, where T_b_pg=M* host symbol time (M is an integer). The phase transition polarity pattern can be a random, pseudo-random, or predetermined fixed sequence, and the sequence parameters can be chosen to achieve desired spectral and correlation properties. The output sequence of pattern generator 608 is multiplied by the sequence of overlay symbols of overlay signal 108 (the additional data) by multiplier 652, and the resulting product is provided to multiplier 607. Multiplier 607 multiplies the phase transition steps generated by the magnitude of the differentiator 606 by the product output by multiplier 652. As previously described, each phase rotation polarity signal in the pattern sequence from multiplier 652 is applied to the sampled PN signal over a span of R symbols.

In one embodiment, the overlay symbol/bit time T_b_wm for signal 108 is in general much longer than the symbol/time T_b_pg for the pattern generator 608, i.e., T_b_wm>>T_b_pg. In a case where there are longer periodic characteristics included in the phase rotation polarity pattern of pattern generator 608 for desired spectral and correlation properties, the additional data bit time must also be longer that the time constants associated with those characteristics. This ensures that the spectral and correlation properties of the phase rotation polarity pattern from pattern generator 608 will not be altered due to the additional data (of overlay signal 108). In another embodiment, there is no constraint on the relationship between the bit times T_b_wm and T_b_pg. For example, the bit times may be equal in order to ensure that the phase rotation of the (phase transition) modulation is random even if the additional data (signal 108) is not (e.g., long sequences of "1s" and "0s"), in order to ensure that the correlation and spectral properties will be preserved.

Figure 7A:
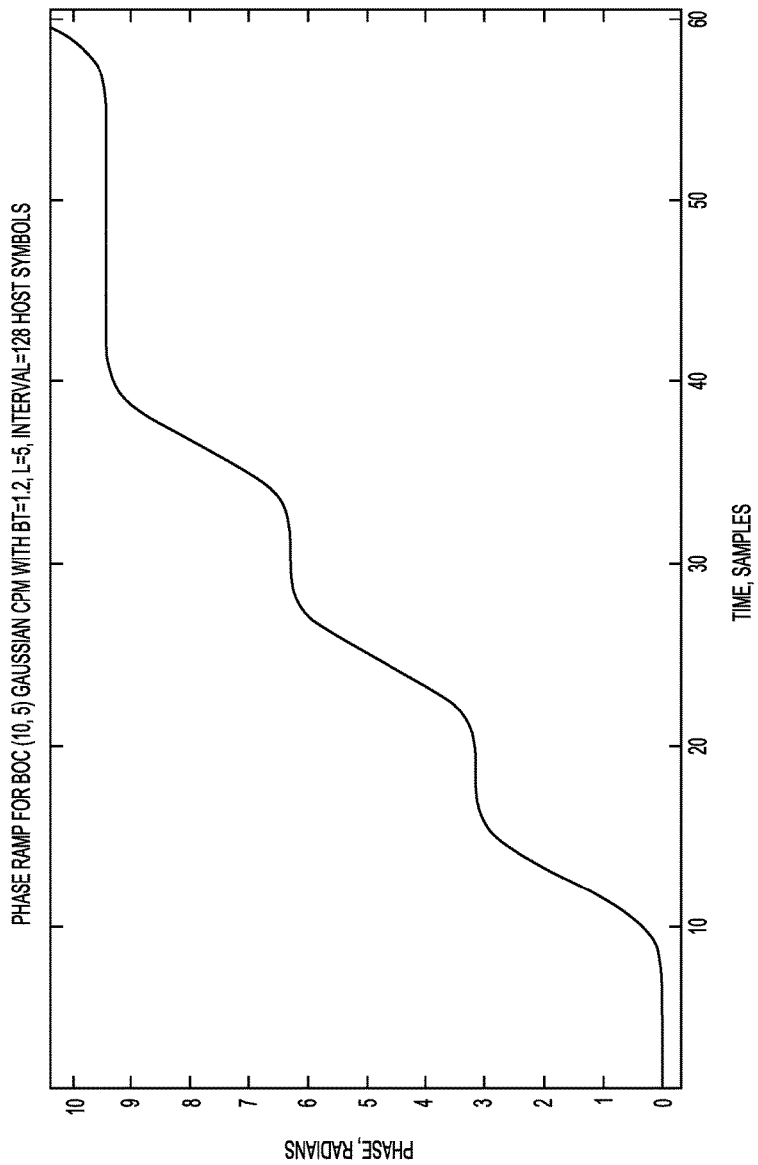
FIG. 7A is a time-domain graph illustrating an example phase trajectory having a series of positive rotation phase transitions between antipodal states over several symbols for a Gaussian filtered phase trajectory CPM BOC(10,5) waveform.

FIG. 7A is a time-domain graph illustrating the output phase trajectory $\varphi(n)$ of an example phase integrator over a span of 60 samples (five host symbols). In this example, the shape of the phase trajectory reflects a Gaussian filter, because a Gaussian CPM BOC(10,5) is used, where BT=1.2 and L=5. In this example, the number of samples per host symbol (N) is 12, such that L/N=5/12. This means that the input frequency pulse to the Gaussian filter is $5/12^{ths}$ of the host symbol in duration. The output of the Gaussian filter is integrated to obtain the phase trajectory shown. Other filters would produce a different phase trajectory. Note that each overlay symbol state (+1 for '1' or −1 for '0') is constant over each R overlay symbol interval (i.e., within any given R overlay symbol interval, the phase transitions are either all positive or all negative). In the example shown in FIG. 7A, because the number of overlay symbols depicted is far fewer than R, all of the phase rotation transitions have the same polarity in this interval, in this case, a positive phase ramp.

Figure 7B:
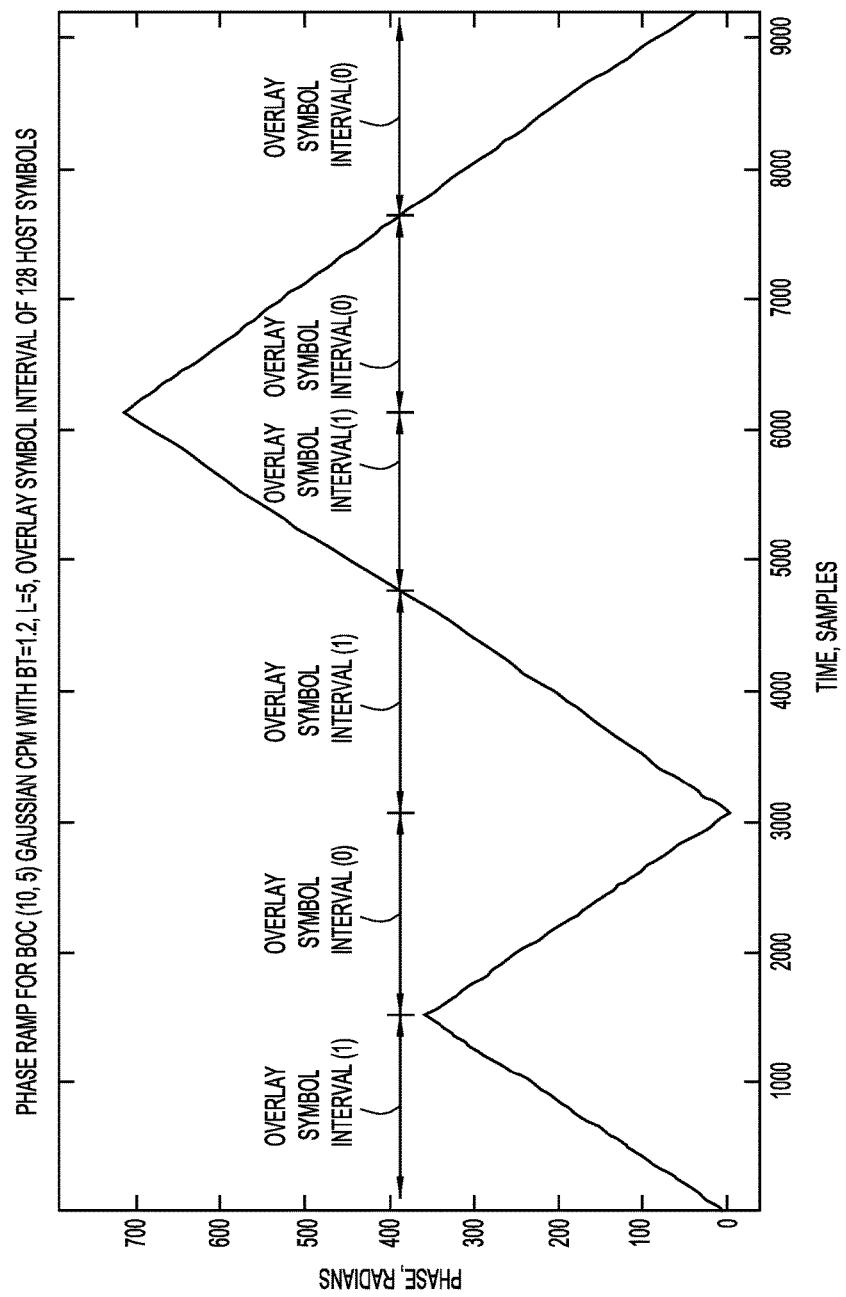
FIG. 7B is a time-domain graph illustrating the same phase trajectory as FIG. 7A over several, R, symbol intervals in a phase rotation polarity pattern, where the phase rotation polarity is constant (either positive or negative) within each R symbol interval.

FIG. 7B is a time-domain graph of the same output signal shown in FIG. 7A (a Gaussian CPM Binary Offset Carrier (BOC)(10,5), BT=1.2, L=5, N=12) but "zoomed out" to show a sequence of 6 overlay symbol state intervals in the phase rotation polarity pattern imposed on/applied to the host waveform, in this case spanning 9216 samples (note that FIG. 7A shows a much smaller span of 60 samples). From the left side of the graph, the phase rotation polarity is positive (+1) over the first R host symbol interval (a set of 128 host symbols) corresponding to one overlay symbol state (spanning the set of 128 host symbols), followed by an second R host symbol interval in which the phase rotation polarity is negative (−1) corresponding to a next overlay symbol state. In this example, R=128. The third and fourth R host symbol intervals have a positive (+1) phase rotation polarity corresponding to two more overlay symbol states, followed by fifth and sixth R host symbol intervals in which the phase rotation polarity is again negative (−1) corresponding to a next overlay symbol state. Thus, in this example, the phase rotation polarity pattern sequence shown is: +, −, +, +, −, −, representing an overlay symbol (state) sequence of 101100. That is, the sequence of overlay symbol states 101100 has been applied to the phase rotation, so that each 128 host symbols comprises one symbol of the superimposed additional data.

Considering, for example, the first R overlay symbol interval shown, while the graph appears to be a substantially straight line extending from 0 to about 360 radians over about 1500 samples, in fact, if one were to "zoom in" to look at a segment of this "line" it would actually look like the curve shown in FIG. 7A, reflecting the Gaussian phase trajectory.

Figure 7C:
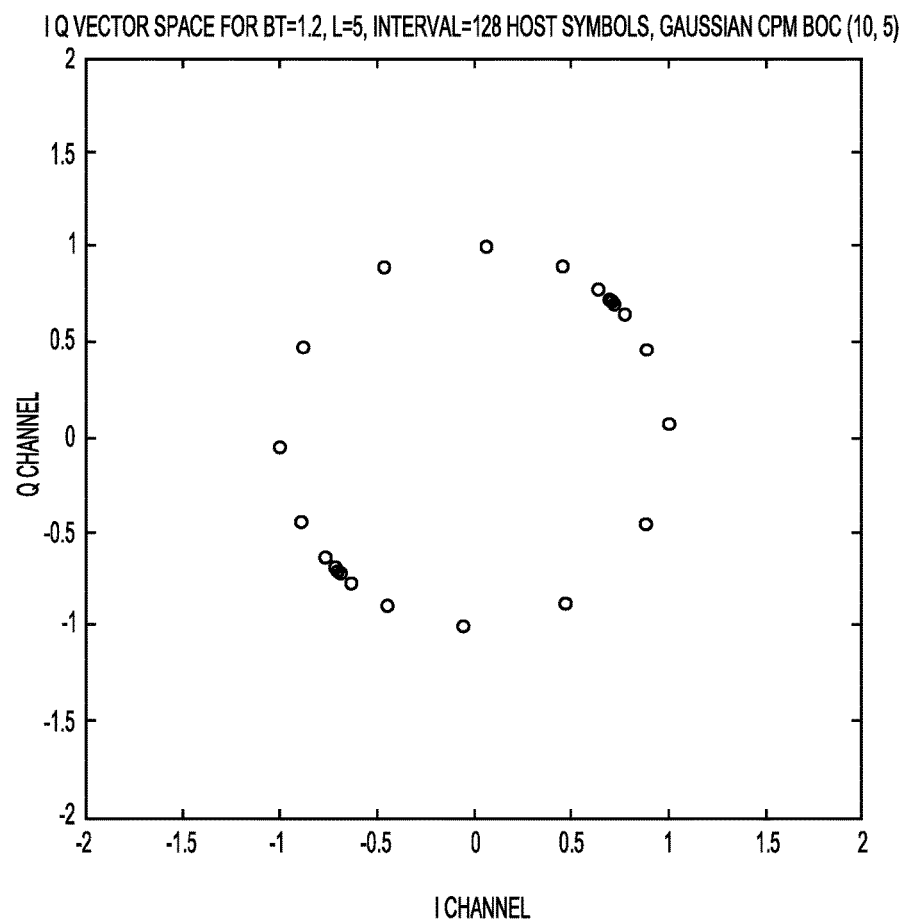
FIG. 7C is a signal vector scatterplot diagram for the same waveform shown in FIGS. 7A and 7B.

FIG. 7C is a signal vector scatterplot diagram for the same waveform shown in FIGS. 7A and 7B (a Gaussian CPM BOC(10,5), BT=1.2, L=5, N=12). In this example, the two antipodal phase states are located at 45° and 225°. The scatterplot shows groupings of phase states dwelling around the two antipodal phase states and six sample phase transitions between the two phase states, which essentially trace out the Gaussian phase trajectory.

FIG. 7D is a frequency-domain graph of the power spectrum of the waveform of FIGS. 7A-7C compared with a reference binary phase shift keying (BPSK) BOC(10,5) waveform with instantaneous phase transitions. Note that power spectrum of the waveform has significantly lower sidelobes (i.e., faster rolloff of sidelobes) than the reference BPSK waveform, similar to a conventional CPM waveform such as GMSK, since smoother phase transitions reduce the higher frequency components of the waveform. However, unlike conventional CPM waveforms, which transition the phase continuously over the entire symbol period, the scheme described herein allows the designer to control the shape and rolloff of the sidelobes by choosing the values of L (the number of samples over which the phase transition occurs) and B.

Figure 7E:
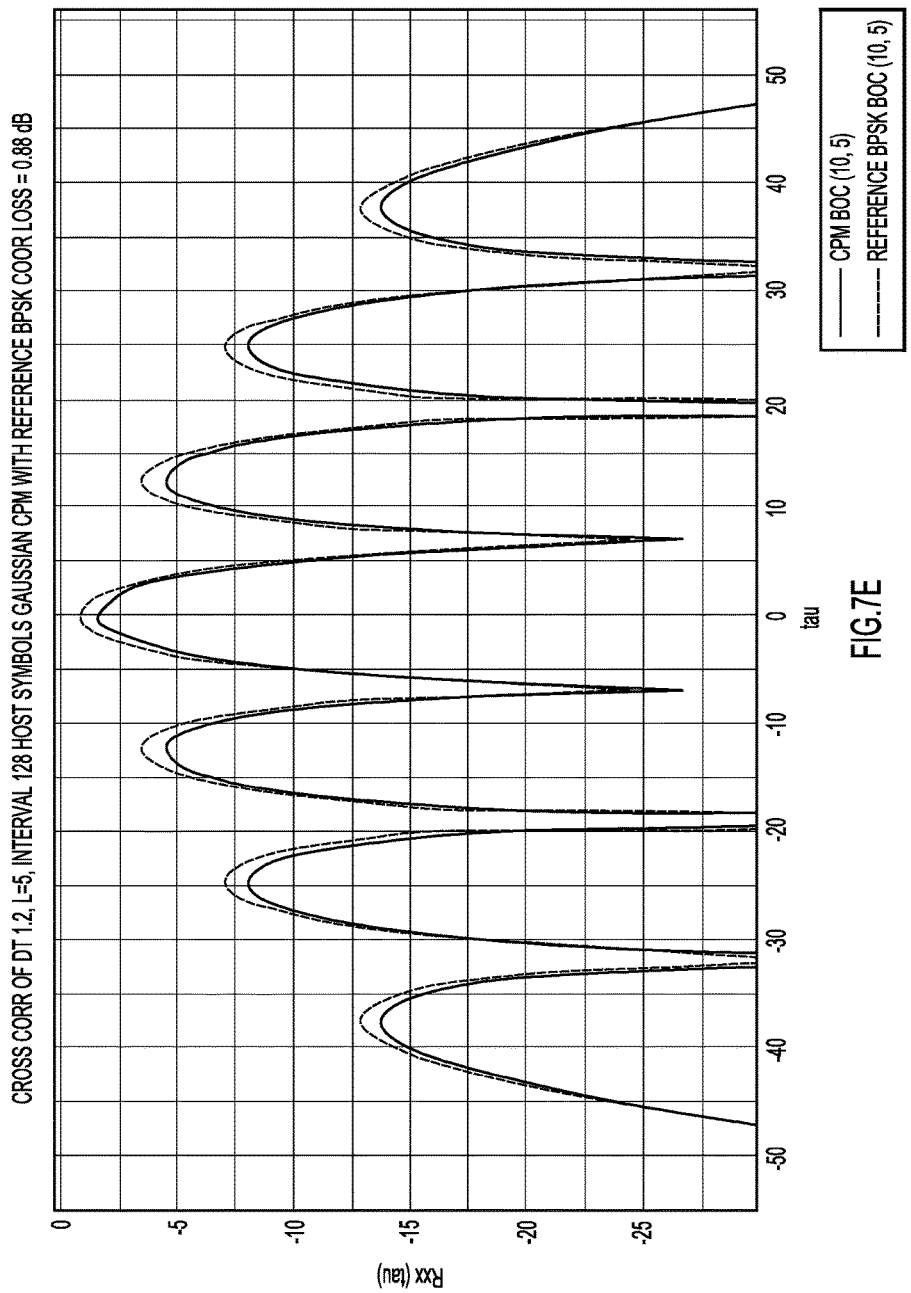
FIG. 7E is a graph illustrating the cross correlation of the waveform of FIGS. 7A-7D compared with the reference BPSK BOC(10,5) waveform.

FIG. 7E is a graph illustrating the cross correlation of the waveform of FIGS. 7A-7D compared to the reference BPSK BOC(10,5) waveform. Notably, the steep nulls are preserved in the Gaussian CPM BOC(10,5) waveform as a result of the phase rotation polarity pattern of the phase transitions being uncorrelated with the PN code of the signal. The preservation of the deep nulls in the cross correlation is a significant difference between this waveform and a conventional CPM waveform (see FIG. 4A) owing to the phase rotation polarity pattern being uncorrelated with the symbol sequence (e.g., the PN code of the transmit signal). The peak of the cross-correlation curve of the Gaussian CPM BOC(10,5) waveform is somewhat lower than that of the reference BPSK waveform as a result of correlation loss owing to the continuous phase transitions.

Figure 7F:
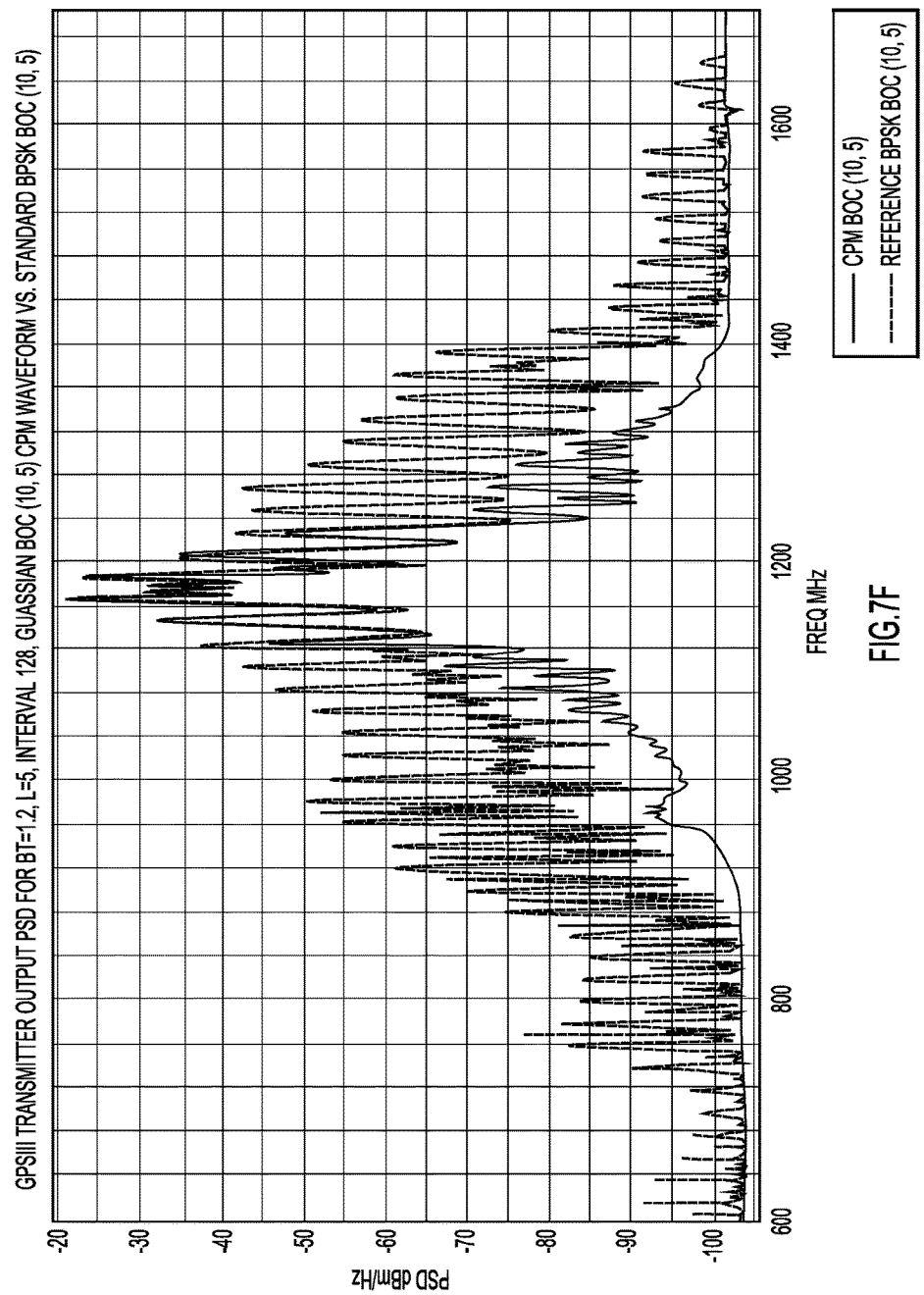
FIG. 7F is a frequency domain graph illustrating the output spectrum of a saturated high power RF amplifier using the waveform of FIGS. 7A-7E compared with the reference BPSK BOC(10,5).

FIG. 7F is a frequency domain graph illustrating the output spectrum of a saturated high power RF amplifier using the waveform of FIGS. 7A-7E (Gaussian CPM BOC (10,5)) compared with the reference BPSK BOC(10,5). Note that the reduced spectrum is preserved in the constant envelope signal at the output of the non-linear RF amplifier. This result shows that a bandwidth efficient waveform has been achieved at the output of the power amplifier.

Extension to M-Ary Modulation

While the foregoing description focuses on antipodal modulation schemes in which the two possible phase states are 180° out of phase, the described techniques can be extended to phase modulation schemes involving M-ary phase constellations. This context is important because multiple navigational codes can be combined on I and Q channels to form a composite waveform having M possible phases. Some examples of M-ary constellation transmission of time acquisition codes are:

1. Sending one code on each quadrature;
2. Using majority vote to combine two or more codes on each quadrature;
3. Interplex combining; and
4. POCET combining.

The described system is extended to these M-ary waveform cases to provide a reduced spectral occupancy and desired correlation performance. More specifically, when there is a phase transition in a CPM waveform, the signal vector transitions between the M phases of the constellation by moving along the unit circle to provide a constant envelope waveform. As previously described, a fraction (L/N) of the samples of a host symbol, where L≤N, can be used to effect the phase transition between adjacent host symbols. The phase trajectory function can be linear, integrated Gaussian, or other smoothed function, as in the antipodal case, to provide desired spectral and correlation properties. Even with an M-ary constellation, there are instances where the phase transition between adjacent host symbols requires a 180° phase transition. For example, suppose a QPSK waveform uses a constellation of four phases at 45°, 135°, 225°, and 315° to represent the logical values 00, 01, 11, 10, respectively. In this case, if adjacent host symbols represent the values 00 and 11 or if adjacent host symbols represent the values 10 and 01, a 180° phase transition is required. According to the described system, in an M-ary waveform, when the phase transition between two adjacent host symbols is 180°, the previously described phase rotation polarity pattern can be employed to determine the direction of the 180° phase transition, as in the antipodal case. When the phase transition between the QPSK host symbols is +90 or −90 degrees, then there are several embodiments. One embodiment may choose to use only the antipodal phase state shifts of the host waveform for encoding the overlay waveform. An alternative embodiment may also encode the +90 and −90 degree transitions of the QPSK host waveform as described previously using possibilities of +90, −270 and −90, +270 such that the average phase shift over the overlay symbol has the desired phase shift polarity and slope value to be demodulated by the overlay receiver processing (e.g., Differential PSK or BFSK).

The example transmitter implementations shown in FIGS. 6A and 6B in the context of an antipodal waveform can be extended to M-ary modulation as follows. After mapping the input sequence to the M-ary phase constellation and sampling the signal at N samples per host symbol, the phase transition position, polarity, and magnitude of each phase transition are found by differentiating the samples. Note that the magnitude of the phase transitions must be determined to be able to differentiate between phase transitions of 180° and smaller phase transitions. Phase transitions that are determined to be less than 180° are passed to the FIR filter 610 unchanged (i.e., no phase rotation polarity modification is made). For phase transitions that are 180°, the output of the symbol state mapper are applied to the output of the differentiator 606 as previously described to modify the phase rotation polarity to superimpose the overlay symbol states of overlay signal 108 on the phase modulation of host signal 106. The remaining processing is the same as previously described in the antipodal case.

In a second implementation of M-ary modulation, even the non-antipodal phase transitions can be transmitted to carry the overlay data as was described above in the QPSK case. For each phase shift the modulator can choose to get there via the shortest trajectory around the unity circle shown in FIG. 2, or it can get there using the long way around. For each overlay symbol that is being sent, the modulator chooses the phase trajectory of each of the host symbol transitions in such a way that the sum total phase transitions over the host symbols corresponds to the desired target phase step corresponding to the transmitted overlay symbol.

Figure 4B:
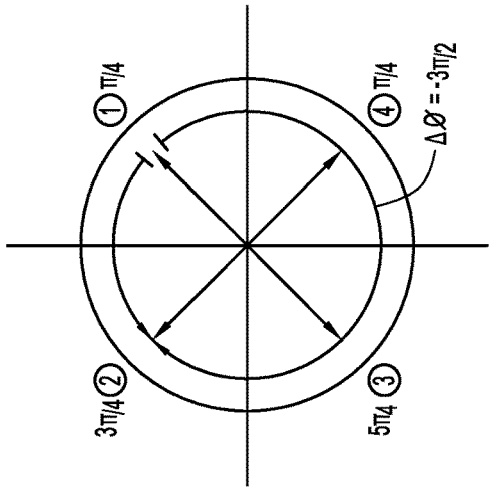
FIG. 4B illustrates a host Q-ary CPM constellation showing two possible phase transitions for a 90 degree host symbol shift, allowing watermarking to be applied for non-antipodal adjacent symbol states.

Thus, phase rotation watermarking may be applied to M>=4 modulations on all symbol phase transitions, both antipodal (phase shift=180 degrees) and non-antipodal. For example with Q-ary CPM, the watermarking may be applied to phase shifts of +90, 180, or −90 degrees as follows. The watermarking method for the case of a 180 degree phase shift has already been described. For a symbol phase shift of 90 degrees, the phase transition may be either +90 degrees in the CCW direction, or −270 degrees in the CW direction. This is depicted in FIG. 4B, which is an illustration of a host Q-ary CPM constellation showing two possible phase transitions for a 90 degree host symbol shift, allowing watermarking to be applied for non-antipodal adjacent symbol states. Similarly, for a symbol phase shift of −90 degrees, the phase transition may be either +270 degrees in the CCW direction, or −90 degrees in the CW direction. These possibilities may be averaged over an overlay symbol of multiple host symbols to arrive at a desired average phase shift slope for the overlay symbol. For example, if the overlay symbol is to be encoded as a positive phase shift slope, and the host signal is a QPSK waveform, then each time the host symbol shift is 90 degrees or −90 degrees, then the total number of host phase transitions that are equal to +90, −90, +270 or −270 would be chosen such that the average of all the host phase transitions over the overlay symbol interval would be either +180 or −180 as in the case where the host is a BPSK CPM waveform. In summary, for the M>=4 case, both the antipodal and the non-antipodal continuous phase transitions of the host waveform are used to carry the data of the overlay symbols. The non-antipodal host phase transitions are controlled by the modulator and encoded to either take the long or short way around the unit circle (i.e., a longest phase path or a shortest phase path) while transitioning to the adjacent phase state, such that the average direction and speed of the phase rotation, or the cumulative phase shift, over the duration of the overlay symbols is encoded to carry the data of the overlay symbols.

Phase rotation watermarking does not require constant amplitude modulation and is therefore not limited to the constant phase modulation techniques described above. Phase rotation watermarking may be applied to Quadrature Amplitude Modulation (QAM) as well. In that case, whenever a 180 degree phase transition takes place in the host waveform (host signal 106), the modulation follows either the CW or CCW direction to carry the overlay signal or "watermark" information. The end symbols would be the same as described above, and only the transition would be used to carry the watermark. Even in this case the watermark would not have to have a significant impact on the host waveform performance. For example, in 16 QAM, each symbol has a 1 in 16 (0.0625) chance of transitioning to a symbol 180 degrees away. The RF waveform therefore has two possible rotation trajectories which are identical for the regular user. These two possibilities can be used for phase rotation watermarking. Even though the amplitude is varying, and only one in 16 symbols would carry the phase rotation watermarking information (overlay symbol states), over time a detector looking for the watermark (overlay symbol states) would accumulate enough phase shift to demodulate the watermark, albeit at a much lower data rate than the host waveform. In this example, for every 1000 symbols of the host waveform, there would be an average of 62 host symbols that could carry watermark (overlay symbol) information. Or, adjacent symbol state shifts which are within some distance of +180 or −180 can still be rotated in either direction as needed to carry the phase slope of the overlay symbol. The modulator can control the transitions of each of the host QAM symbols of the overlay symbol over the I-Q space so as to effect a total phase shift equal to the desired phase shift of the overlay symbol.

Second Example Transmitter Implementation

Figure 8:
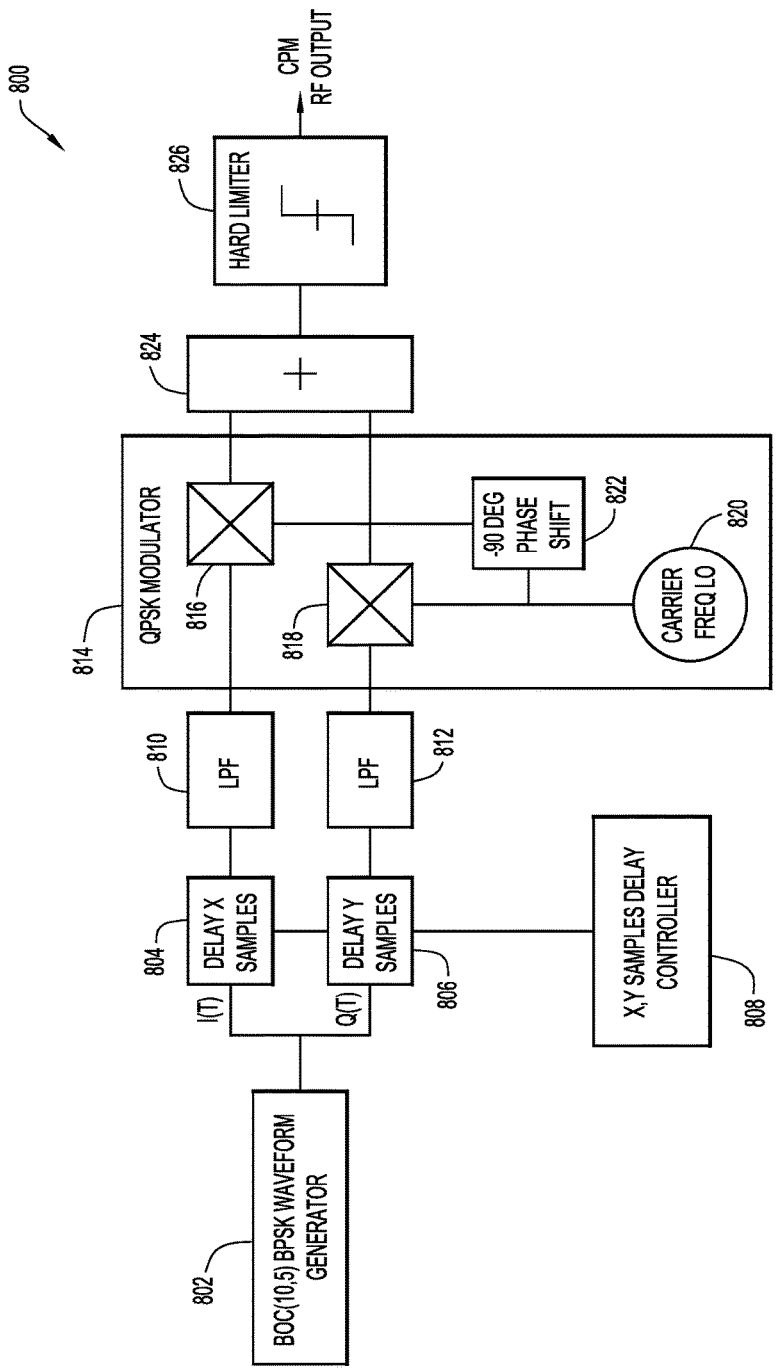
FIG. 8 is a block diagram of another implementation of a modulation system capable of implementing phase rotation watermarking.

FIG. 8 is a block diagram illustrating components of another example transmitter implementation of a modulator system 800 capable of generating an antipodal (e.g., BPSK) transmit signal having continuous phase transition trajectories according to phase rotation watermarking wherein the phase rotation polarity pattern follows the sequence of overlay symbol states of overlay signal 108. Compared to the first example transmitter implementations shown in FIGS. 6A and 6B, the implementation shown in FIG. 8 relies more heavily on hardware than digital signal processing to apply the phase rotation polarity pattern and to produce the transmit signal.

In the example shown in FIG. 8, a waveform generator 802 generates a digital baseband time-domain sample stream representing a BPSK BOC(10,5) waveform (signal 106), which is split and supplied both to an I-channel (I(t)) and to a Q-channel (Q(t)). The sample stream I(t) is supplied to an I-channel delay device 804 ("delay X samples"), and the sample stream Q(t) is supplied to a Q-channel delay device 806 ("delay Y samples"). An X, Y Samples Delay Controller 808 controls delay devices 804 and 806 to selectively delay either the I(t) or Q(t) signal by L samples. The decision of whether the I(t) or Q(t) signal is delayed is determined by the output of the delay controller 808. The selection of delaying I(t) or Q(t) is equivalent to selecting a positive or negative phase rotation at the downstream hard limiter output. Thus, in this implementation, the delay controller 808 essentially operates as the symbol state mapper by selectively applying delays to the I and Q channel signals to create a phase rotation polarity pattern representative of the sequence of overlay symbol states of signal 108. In effect, this implementation provides a different way of generating a CPM waveform while "patternizing" the polarity of the 180° phase transitions in accordance with overlay signal 108.

After selective application of a delay to the signals I(t) and Q(t), the resulting I and Q signals are then filtered by respective low pass filters 810 and 812 to produce filtered baseband I and Q signals, and then supplied to a quadrature phase shift keying (QPSK) modulator 814. QPSK modulator 814 includes an I-channel mixer 816 that mixes the filtered baseband I signal with a carrier frequency signal supplied by a local oscillator 820, which has been phase shifted by −90° relative to the Q-channel by a phase shifter 822, to produce a carrier-frequency I-channel signal. QPSK modulator 814 further includes a Q-channel mixer 818 that mixes the filtered baseband Q signal with the carrier frequency signal supplied by local oscillator 820 to produce a carrier-frequency Q-channel signal.

A combiner 824 combines the carrier frequency I-channel and Q-channel signals, and the output of combiner 824 is hard limited by a hard limiter 826 (e.g., a saturated amplifier) at low power. Alternatively, the carrier frequency I and Q signals can be hard limited in DSP processing by first converting the I and Q signals from rectangular to polar format, then fixing the amplitude to be constant, and then converting back to a rectangular (I and Q) format. The resulting constant envelope waveform preserves the phase information of the signal and can be fed as the input to a saturated amplifier such as a travelling wave tube or a solid state amplifier. Because the waveform has a constant envelope, the spectral regrowth through the saturated amplifier is minimized.

The parameters of the low pass filters 810 and 812 can be optimized to provide the best bandwidth efficiency and correlation performance tradeoff. These include the filter characteristic function and bandwidth. By way of non-limiting examples, analog, digital FIR, or digital IIR filters can be used.

As with the first example implementation, the second example implementation can be extended to apply to M-ary modulation schemes. In particular, the waveform generator 802 of FIG. 8 generates a baseband M-ary waveform and, when a phase transition of 180° occurs, the sample delay controller 808 delays either the I or Q signal by L samples in accordance with the phase rotation polarity pattern, as previously described. For phase transitions less than 180°, sample delay controller 808 does not apply any delay to the I and Q signals, and the processing otherwise remains essentially the same.

Example Receiver

Figure 9:
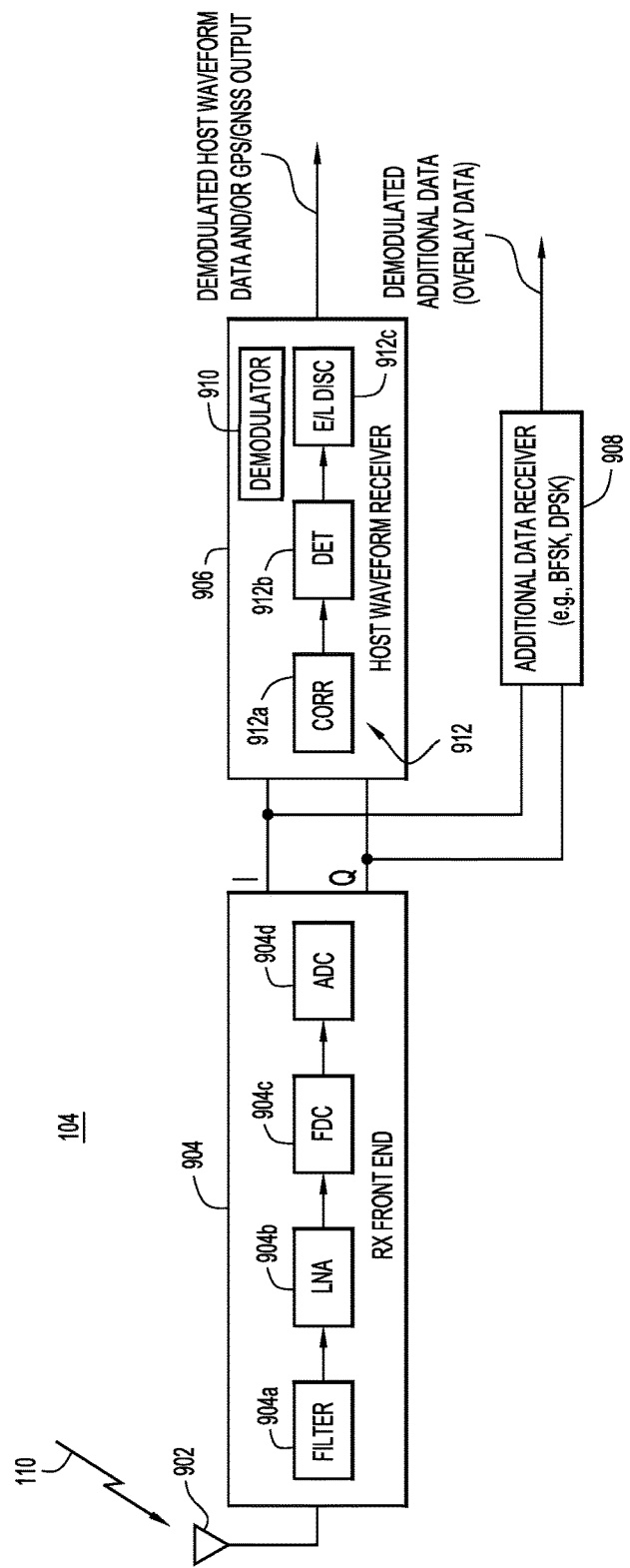
FIG. 9 is a block diagram of an example receiver capable of demodulating a phase modulated host waveform and demodulating phase rotation modulation of additional data overlaying the host waveform.

With reference to FIG. 9, there is a block diagram of an example of receiver 104 to receive and process RF phase modulated transmit signal 110 transmitted from transmitter 102. Receiver 104 includes an antenna 902, an RF front-end 904, a host waveform receiver 906, and an additional data receiver 908 that operates in parallel with the host waveform receiver. Antenna 902 captures signal 110 and delivers it to RF front-end 904. RF front-end includes, in series: an RF filter 904a to filter the RF signal captured and delivered by the antenna; a low noise amplifier (LNA) 904b to amplify the filtered RF signal; a frequency-downconverter (FDC) or mixer 904c to frequency down-convert the amplified RF signal to produce frequency-downconverted quadrature I and Q signals; and an analog-to-digital converter (ADC) to digitize the I and Q signals and provide them to the host waveform receiver 906 and additional data receiver 908 in parallel. The frequency-downconverted I and Q signals may be at baseband, or at an intermediate frequency between baseband and the RF frequency of signal 110.

In an embodiment, host waveform receiver 906 includes a host waveform demodulator 910 to demodulate the phase modulated host symbols conveyed in signal 110, to recover and output a replica of signal 106 (i.e., demodulated host waveform data). Demodulator 910 may include a GMSK/BPSK/DPSK or other type of demodulator to demodulate the corresponding type of modulation used to modulate the host symbols of signal 106. In another embodiment, host waveform receiver 906 alternatively, or additionally, includes a GPS/GNSS (i.e., navigation-related) receiver 912, including: a correlator 912a to correlate the host symbols against a local code; a detector to detect the correlated signal; and an early/late (E/L) discriminator to ascertain a best estimate of the time offset of the correlated signal used to calculate time and position. GPS/GNSS receiver 912 outputs GPS/GNSS time, position, and message data.

Additional data receiver 908 (also referred to as a "watermark demodulator" or an "additional data demodulator") operates on the I and Q signals from RF front-end 904 in parallel with, but independent of, host waveform receiver 906. Additional data receiver 908 may use any of several methods, including a binary frequency shift keying (BFSK) detection method and a DPSK detection method, to extract the additional data (i.e., overlay symbols of signal 108) from the I and Q signals derived from signal 110.

The BFSK detection method is described first. In this method, additional data receiver 908 is configured as a BFSK demodulator. As described above and shown in FIG. 7B, phase rotation watermarking of continuous, antipodal phase transitions results in either a positive or a negative phase slope/ramp that accumulates over R symbols spanned by an overlay symbol (state). The positive or negative phase slope is indicative of the overlay symbol state. The positive or negative phase slope is actually a positive shift in frequency or a negative shift in frequency away from a carrier frequency. That is, the phase slope, when differentiated, represents the frequency shift. Therefore, a now known or hereafter developed BFSK demodulator may be used to detect the positive and the negative frequency shifts corresponding to the positive and negative slopes. The +/−frequency offsets may be calculated from the slope of the phase function (slope) over the time interval of the overlay symbols, which are in general much longer than the time intervals of the host symbol modulation waveform.

The DPSK detection method is now described. In this method, additional data receiver 908 is configured as a DPSK demodulator. The DPSK demodulator calculates a phase corresponding to each I and Q sample pair from RF front-end 904. Then, the DPSK demodulator computes an incremental phase difference between each current and previous sample pair, and sums the incremental phase differences across/for all of the sample pairs over the time interval of the overlay symbol, to produce a total phase shift over, and representative of, the overlay symbol (this is performed repeatedly for each (modulated) overlay symbol in signal 110). The polarity of this phase shift determines the demodulated overlay symbol state/data bit; a positive phase shift results in a DPSK demodulator output of '1' and negative phase shift results in an of output of '0'.

Figure 10:
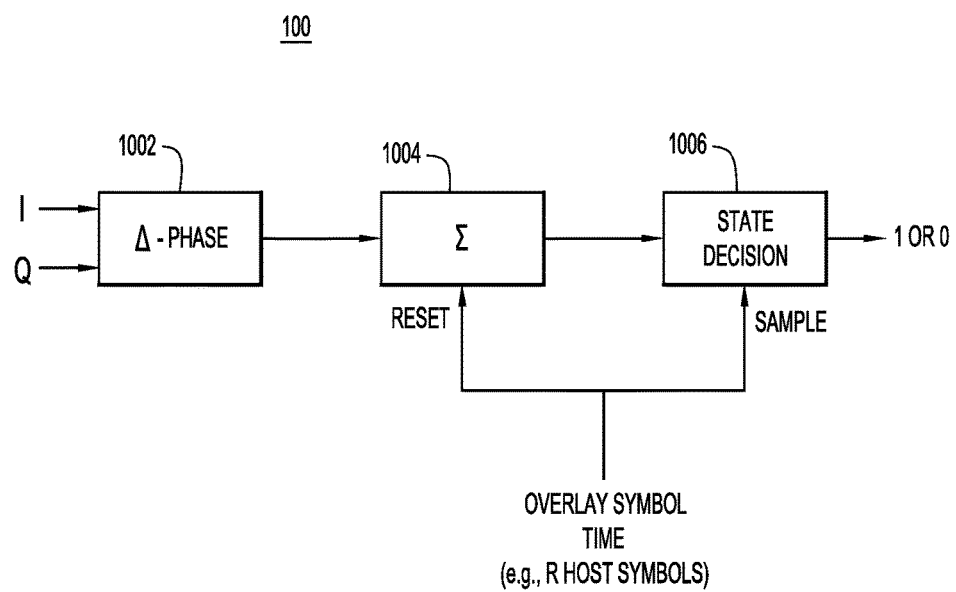
FIG. 10 is a block diagram of an example phase rotation watermarking demodulator.

With reference to FIG. 10, there is a block diagram of a DPSK demodulator 1000 that may be used in additional data receiver 104 to demodulate phase rotation watermarking (i.e., the overlay symbols). Demodulator 1000 includes a phase detector 1002 to compute incremental phase differences between successive pairs of I and Q samples from RF front-end 104, a phase accumulator 1004 to accumulate the incremental phase differences over a time interval of an overlay symbol, and a symbol state determiner 1006 that samples an output of the phase accumulator (which will have accumulated either a positive or a negative phase ramp) once per overlay symbol time interval to determine the overlay symbol state ('1' or '0') for that time interval. A timing signal indicative of the overlay symbol time interval resets phase accumulator 1004 and triggers sampling of determiner 1006 once every overlay symbol time interval.

Both the BFSK and DPSK demodulators described above may be non-coherent. The host and overlay symbols could be used to derive symbol time the same way any conventional BFSK and DPSK demodulators derive symbol time. For coherent detection of the additional data, a known preamble pattern may be sent at the start of each additional data "frame." The demodulator may first correlate with the preamble to determine a phase offset, and then perform its demodulation coherently. This would result in a performance improvement in an associated BER vs. $E_b/N_o$ curve, compared to non-coherent detection.

In the embodiments or receiver 104 described above, host waveform receiver 906 and additional data receiver 908 are parallel, independent receivers. In another embodiment, receivers 906 and 908 may be integrated, or their various functions may be integrated. For example, in a navigation system, overlay symbols of overlay signal 108 may be detected first and then used for coarse acquisition of time/frequency and phase for processing of host symbols of host signal 106. In the navigation system, the overlay symbols of overlay signal 108 may represent an overlay code, while the host symbols of host signal 106 represent a "baseline" underlying code. Thus, receiver 104 acquires the overlay code for coarse time and position, and then uses this to transition to the underlying code, which is at a higher bandwidth, for finer more accurate time and position estimation. For example, in a current navigation system, receivers first acquire a C/A code and then acquire a P waveform. This requires two separate codes to be transmitted and combined. With the method described herein, the coarse code can be embedded in the waveform of the fine code so that no additional code need be transmitted.

More specifically, phase rotation watermarking may be used as a coarse code in GPS/GNSS for acquisition prior to transition to a fine high bandwidth code. That is, a GPS/GNSS navigation code similar to the C/A code is transmitted by superimposing it on the finer higher bandwidth code using the phase rotation watermarking. In a receiver, a local version of the "watermarked" coarse code consisting of the rising and falling phase ramps as shown in FIG. 7B is correlated with incoming I and Q samples from RF front-end 904 and shifted in time until a peak is detected. Similarly, the delta early and late versions used in correlator 912a are combined to form the early/late discriminator output of 912c as is done for the standard GPS/GNSS waveforms, as well as demodulating navigational messages sent along with the coarse code, as is done when receiving the C/A code before transitioning to the higher bandwidth codes. Acquisition of coarse time and position, and demodulation of the navigational message would enable the receiver to transition to acquisition of the finer high bandwidth code in a more efficient, resilient manner than trying to acquire the high bandwidth code directly.

Similarly, this method can be used as a more efficient method of communication links to embed coarse and fine acquisition codes into a single transmitted waveform. Some receivers would acquire the coarse waveform and demodulate the lower bandwidth data in the watermarking overlay and stop there, while others could use the coarse code as a prelude to acquiring the fine code and demodulate the high bandwidth data. Still other receivers may only have the encryption key for either the watermark data or the baseline code, and would not be able to see the other layer of data.

Summary

In summary, phase rotation watermarking provides a simple, robust, hard to detect, method of using a host data stream to carry additional data with minimal degradation to its performance. Phase rotation watermarking exploits the inherent phase trajectory rotation ambiguity that exists between antipodal symbols of a BPSK, QPSK, MPSK, or other host waveform to carry an additional data channel. When the host waveform transitions between its adjacent symbols which are antipodal (180 degrees apart) there are two equivalent directions the phase trajectory can take, either clockwise or counter-clockwise. Phase rotation watermarking uses these two direction possibilities to carry additional information. In an alternate implementation, for $M>=4$ PSK modulation, phase rotation watermarking can even use the non-antipodal shifts in the host symbols to carry the overlay data, by using both the shortest phase path (i.e., short way) and the longest phase path (i.e., long way) around the unit circle between adjacent phase states to achieve an average or cumulative positive or negative phase rotation polarity during the duration of the overlay symbol. Phase rotation watermarking requires less hardware complexity than many of the other methods in use. For CPM systems, minimal changes are needed to the modulator hardware as the phase rotation is already being generated by the modulation.

Numerous communication systems currently using BPSK, QPSK, M-ary PSK, and QAM modulations and can be modified to use phase rotation watermarking to send additional information across a transmission channel. Such applications include digital transmission of video, using the phase rotation watermarking overlay to carry audio and other messaging simultaneously with the host waveform. Also, digital television standards currently in place for space, terrestrial, and cable transmission (DVB-T, DVB-S, DVB-C, DSS) all use modulations that can use phase rotation watermarking. In addition, Sirius XM satellite radio uses QPSK transmission which can be overlaid with phase rotation watermarking. Applications include covert messages sent over these public transmission channel which can only be detected by phase rotation watermark receivers, with appropriate encryption for privacy, or public service messages for all users. Also, digital storage of software, movies, music, photographs, and other documents, may use the phase rotation watermarking to overlay authentication to detect, prevent, and discourage unlawful distribution.

Civilian GPS receivers may recover a phase rotation watermarking overlay channel to automatically receive updated map and services information from any location in the world independent of cell phone or internet infrastructure GPS receivers could receive region-specific public service announcements regarding emergency situations, independent of normal cell phone infrastructure. Military users could use their GPS receivers to receive covert, encrypted, region specific, incoming data from any point on earth, independent of any other infrastructure.

Software Defined Radio (SDR) technology is fast becoming a popular approach to design communication equipment. This technology allows the same hardware to be configured in multiple ways depending on the software/firmware installed. Phase rotation watermarking would allow SDR radios to receive automatic updates so that they could be reconfigured in the field. Applications include automatic reconfiguring of TV receivers (terrestrial, satellite, or cable), satellite radio receivers, and other user equipment by a central office. This could be used to update to a new transmission standard, to correct a software bug, or to provide improved performance applicable to both civilian and Military GPS users.

In summary, in one aspect, a method is provided comprising: generating a sequence of phase modulated host symbols having continuous, antipodal phase transitions between adjacent ones of the host symbols representing different states; receiving a sequence of overlay symbols each spanning a respective set of the host symbols; rotating the continuous, antipodal phase transitions between the adjacent ones of the host symbols in each set of the host symbols in a same rotation direction according to a symbol state of the respective overlay symbol spanning the set of the host symbols; and generating a phase modulated transmit signal that conveys the continuous, antipodal phase transitions rotated according to the symbol states of the overlay symbols.

In yet another aspect, an apparatus is provided comprising a baseband signal generator to generate a sequence of phase modulated host symbols having continuous, antipodal phase transitions between adjacent ones of the host symbols representing different states; a phase rotator to receive a sequence of overlay symbols each spanning a respective set of the host symbols, and to rotate the continuous, antipodal phase transitions between the adjacent ones of the host symbols in each set of the host symbols in a same rotation direction according to a symbol state of the respective overlay symbol spanning the set of the host symbols; and an RF modulator to generate a phase modulated transmit signal that conveys the continuous, antipodal phase transitions of the phase modulated host symbols rotated according to the symbol states of the overlay symbols.

In another aspect, an apparatus is provided comprising: a radio frequency (RF) front-end to receive an RF signal and frequency down-convert the RF signal to a down-converted signal, wherein the RF signal and the down-converted signal each conveys (i) a sequence of phase modulated host symbols having continuous, antipodal phase transitions between adjacent host symbols representing different states, and (ii) a sequence of overlay symbols each spanning a respective set of the host symbols in time, wherein the continuous, antipodal phase transitions in each set of the host symbols are rotated in a same direction according to an overlay symbol state of the respective overlay symbol spanning the set of host symbols; a first demodulator to demodulate the host symbols from the down-converted signal; and a second demodulator to demodulate the overlay symbols from the down-converted signal.

Having described example embodiments of a system and methods for bandwidth efficient phase modulation, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method, comprising:
   generating a sequence of phase modulated host symbols having continuous, antipodal phase transitions between adjacent ones of the host symbols representing different states;
   receiving a sequence of overlay symbols each spanning a respective set of the host symbols;
   rotating the continuous, antipodal phase transitions between the adjacent ones of the host symbols in each set of the host symbols in a same rotation direction according to a symbol state of the respective overlay symbol spanning the set of the host symbols; and
   generating a phase modulated transmit signal that conveys the continuous, antipodal phase transitions rotated according to the symbol states of the overlay symbols.

2. The method of claim 1, wherein the rotating includes:
   rotating the continuous, antipodal phase transitions in a clockwise direction when the symbol state has a first value; and
   rotating the continuous, antipodal phase transitions in a counterclockwise direction when the symbol state has an second value.

3. The method of claim 1, further comprising:
   receiving a host signal including a sequence of host signal values; and
   wherein the generating the sequence of phase modulated host symbols includes generating the sequence of phase modulated host symbols from the host signal such that host symbols represent the host signal values.

4. The method of claim 1, further comprising:
   prior to the rotating, patternizing the sequence of overlay symbols in accordance with a phase rotation polarity pattern to produce the sequence of overlay symbols as a patternized sequence of overlay symbols,
   wherein the rotating includes rotating the continuous, antipodal phase transitions in accordance with patternized sequence of overlay symbols.

5. The method of claim 1, wherein the host symbols include non-antipodal phase transitions, the rotating includes rotating both the antipodal phase transitions and the non-antipodal phase transitions in accordance with symbol states of the overlay symbols, and the generating includes generating the phase modulated transmit signal such that the transmit signal conveys the antipodal phase transitions and the non-antipodal phase transitions rotated according to the symbol states of the overlay symbols.

6. An apparatus, comprising:
   a baseband signal generator to generate a sequence of phase modulated host symbols having continuous, antipodal phase transitions between adjacent ones of the host symbols representing different states;
   a phase rotator to receive a sequence of overlay symbols each spanning a respective set of the host symbols, and to rotate the continuous, antipodal phase transitions between the adjacent ones of the host symbols in each set of the host symbols in a same rotation direction according to a symbol state of the respective overlay symbol spanning the set of the host symbols; and
   an RF modulator to generate a phase modulated transmit signal that conveys the continuous, antipodal phase transitions of the phase modulated host symbols rotated according to the symbol states of the overlay symbols.

7. The apparatus of claim 6, wherein the phase rotator is configured to:
   rotate the continuous, antipodal phase transitions in a clockwise direction when the symbol state has a first value; and
   rotate the continuous, antipodal phase transitions in a counterclockwise direction when the symbol state has a second value.

8. The apparatus of claim 6, wherein a phase trajectory of the continuous, antipodal phase transitions extends over an entire host symbol.

9. The apparatus of claim 6, wherein a phase trajectory of the continuous, antipodal phase transitions extends over only part of a host symbol.

10. The apparatus of claim 6, wherein the continuous, antipodal phase transitions have an integrated, Gaussian filtered frequency pulse phase trajectory.

11. The apparatus of claim 6, wherein the continuous, antipodal phase transitions have an integrated, raised cosine filtered frequency-pulse phase trajectory.

12. The apparatus of claim 6, wherein the continuous, antipodal phase transitions have a linear phase trajectory.

13. The apparatus of claim 6, wherein the continuous, antipodal phase transitions have a continuous phase trajectory.

14. The apparatus of claim 6, wherein the host symbols include non-antipodal phase transitions, the phase rotator is configured to rotate both the antipodal phase transitions and the non-antipodal phase transitions in accordance with symbol states of the overlay symbols, and the RF modulator is configured to generate the phase modulated transmit signal such that the transmit signal conveys the antipodal phase transitions and the non-antipodal phase transitions rotated according to the symbol states of the overlay symbols.

15. The apparatus of claim 14, wherein the phase rotator is further configured to rotate each non-antipodal phase transition either a long way around a unit circle or a short way around the unit circle while transitioning to an adjacent phase state, such that an average direction and speed of a resulting phase rotation, or a cumulative phase shift, over a duration of an overlay symbol is encoded to carry the overlay symbol.

16. An apparatus, comprising:
  a radio frequency (RF) front-end to receive an RF signal and frequency down-convert the RF signal to a down-converted signal, wherein the RF signal and the down-converted signal each conveys (i) a sequence of phase modulated host symbols having continuous, antipodal phase transitions between adjacent host symbols representing different states, and (ii) a sequence of overlay symbols each spanning a respective set of the host symbols in time, wherein the continuous, antipodal phase transitions in each set of the host symbols are rotated in a same direction according to an overlay symbol state of the respective overlay symbol spanning the set of host symbols;
  a first demodulator to demodulate the host symbols from the down-converted signal; and
  a second demodulator to demodulate the overlay symbols from the down-converted signal.

17. The apparatus of claim 16, wherein the second demodulator includes a Differential Phase Shift Keying (DPSK) demodulator to demodulate the overlay symbols.

18. The apparatus of claim 16, wherein the second demodulator includes a Binary Frequency Shift Keying (BFSK) demodulator to demodulate the overlay symbols.

19. The apparatus of claim 16, the second demodulator is configured to:
  detect a respective total phase change over each set of host symbols due to the continuous, antipodal phase transitions in the set of the host symbols; and
  determine the symbol state of the overlay symbol spanning the set of host symbols based on the detected respective total phase change.

20. The apparatus of claim 19, wherein the total phase change is positive or negative when the continuous, antipodal phase transitions in the set of host symbols are rotated counter-clockwise or clockwise according to the symbol state of the respective overlay symbol, respectively, and the second demodulator is configured to determine the symbol state based on whether the total phase change is positive or negative.

* * * * *